United States Patent
Brown et al.

(10) Patent No.: US 9,348,470 B2
(45) Date of Patent: May 24, 2016

(54) PROJECTED CAPACITANCE TOUCH PANEL WITH REFERENCE AND GUARD ELECTRODE

(75) Inventors: Christopher James Brown, Oxford (GB); Michael Paul Coulson, Kidlington (GB)

(73) Assignee: Sharp Kabushiki Kaisha, Osaka (JP)

( * ) Notice: Subject to any disclaimer, the term of this patent is extended or adjusted under 35 U.S.C. 154(b) by 276 days.

(21) Appl. No.: 13/436,010

(22) Filed: Mar. 30, 2012

(65) Prior Publication Data

US 2013/0257786 A1 Oct. 3, 2013

(51) Int. Cl.
G06F 3/044 (2006.01)

(52) U.S. Cl.
CPC ........... *G06F 3/044* (2013.01); *Y10T 29/49105* (2015.01)

(58) Field of Classification Search
USPC ................ 178/18.06; 327/291; 345/173, 174; 702/65; 355/72; 73/304 C
See application file for complete search history.

(56) References Cited

U.S. PATENT DOCUMENTS

| | | | |
|---|---|---|---|
| 4,293,734 A | 10/1981 | Pepper | |
| 5,543,588 A | 8/1996 | Bisset et al. | |
| 2002/0190773 A1* | 12/2002 | Manganaro | 327/291 |
| 2006/0007171 A1* | 1/2006 | Burdi et al. | 345/173 |
| 2007/0074914 A1* | 4/2007 | Geaghan et al. | 178/18.06 |
| 2009/0135157 A1 | 5/2009 | Harley | |
| 2009/0194344 A1 | 8/2009 | Harley | |
| 2010/0079401 A1 | 4/2010 | Staton | |
| 2010/0292945 A1* | 11/2010 | Reynolds et al. | 702/65 |
| 2010/0302201 A1 | 12/2010 | Ritter et al. | |
| 2010/0309162 A1 | 12/2010 | Nakanishi et al. | |
| 2010/0328240 A1 | 12/2010 | Matsubara | |
| 2011/0007030 A1* | 1/2011 | Mo et al. | 345/174 |

FOREIGN PATENT DOCUMENTS

| | | |
|---|---|---|
| JP | 2010-282501 A | 12/2010 |
| JP | 2011-008723 A | 1/2011 |
| JP | 2011-081578 A | 4/2011 |

* cited by examiner

*Primary Examiner* — Dwayne Bost
*Assistant Examiner* — Sepehr Azari
(74) *Attorney, Agent, or Firm* — Renner, Otto, Boisselle & Sklar, LLP

(57) ABSTRACT

A mutual capacitance touch panel device includes a substrate, and an array of electrode elements formed on the substrate. Each electrode element includes a drive electrode, a sense electrode and a reference electrode, the reference electrode arranged between the drive electrode and the sense electrode. A first mutual coupling capacitance is formed between the drive electrode and the reference electrode of each electrode element, wherein the drive electrode and reference electrode are configured such that the first mutual coupling capacitance is substantially insensitive to an object touching the surface of the touch panel.

19 Claims, 23 Drawing Sheets

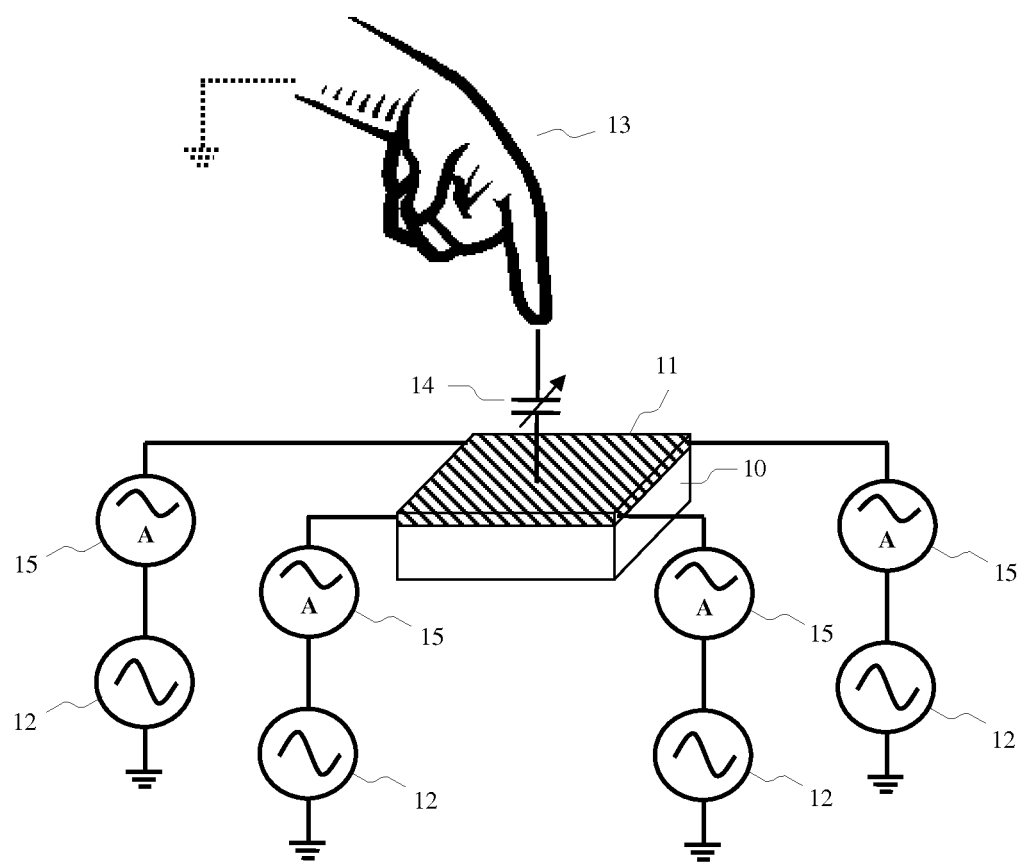
FIG 1 (Conventional)

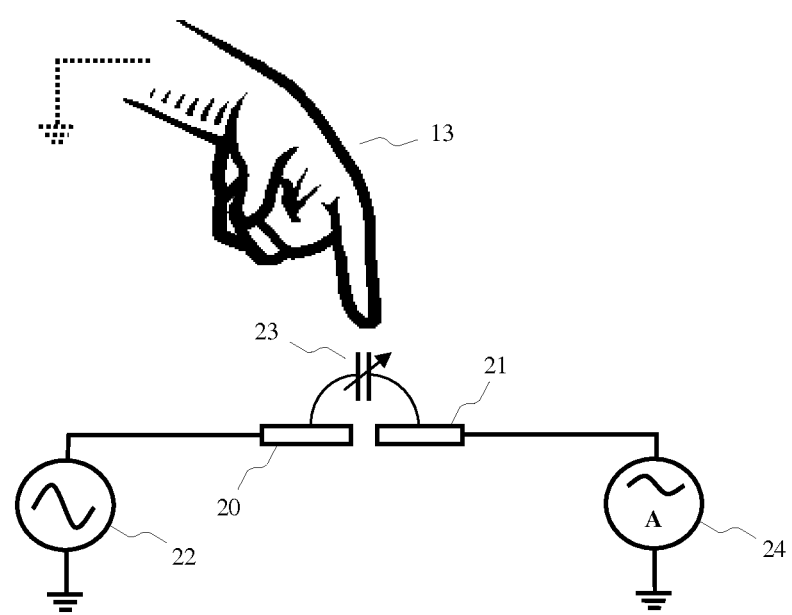
FIG 2 (Conventional)

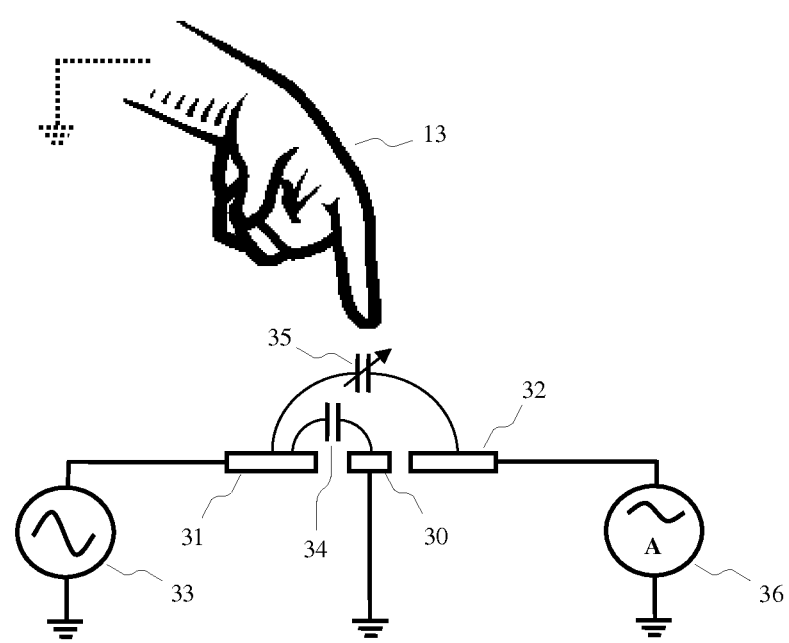
FIG 3 (Conventional)

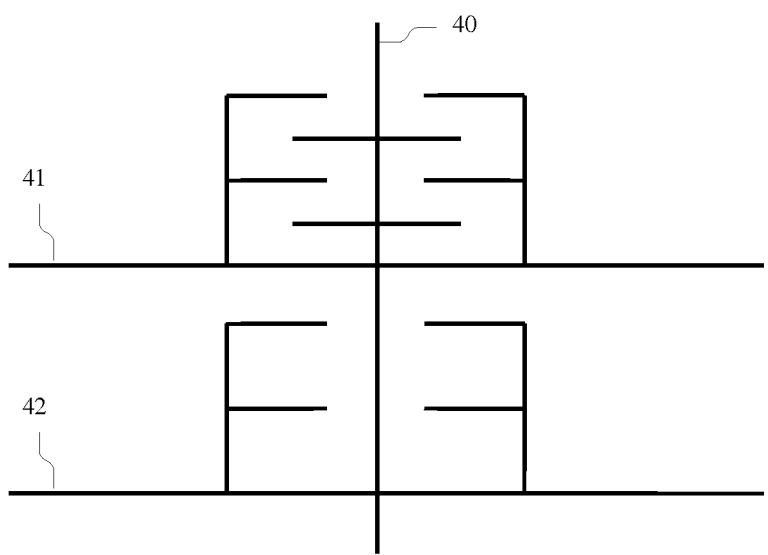
FIG 4 (Conventional)

PROJECTED CAPACITANCE TOUCH PANEL WITH REFERENCE AND GUARD ELECTRODE

TECHNICAL FIELD

The present invention relates to touch panel and display devices. In particular, this invention relates to projected capacitance touch panels integrated with liquid crystal display (LCD) devices. Such an LCD device with integrated touch panel may find application in a range of consumer electronic products including, for example, mobile phones, tablet and desktop PCs, electronic book readers and digital signage products.

BACKGROUND ART

Touch panels have recently become widely adopted as the input device for high-end portable electronic products such as smart-phones and tablet PCs. Although, a number of different technologies can be used to create these touch panels, capacitive systems have proven to be the most popular due to their accuracy, durability and ability to detect touch input events with little or no activation force.

The most basic method of capacitive sensing for touch panels is demonstrated in surface capacitive type touch panels (also known as self-capacitance type touch panels), for example as disclosed in U.S. Pat. No. 4,293,734 (Pepper, Oct. 6, 1981). A typical implementation of a surface (self) capacitance type touch panel is illustrated in FIG. 1 and comprises a transparent substrate 10, the surface of which is coated with a conductive material that forms a sensing electrode 11. One or more voltage sources 12 are connected to the sensing electrode, for example at each corner, and are used to generate an electric field which extends above the substrate. When a conducting object, such as a human finger 13, comes into close proximity to the sensing electrode, a capacitor 14 is dynamically formed between the sensing electrode 11 and the finger 13 and this field is disturbed. The capacitor 14 causes a change in the amount of current drawn from the voltage sources 12 wherein the magnitude of current change is related to the distance between the finger location and the point at which the voltage source is connected to the sensing electrode. Current sensors 15 are provided to measure the current drawn from each voltage source 12 and the location of the touch input event is calculated by comparing the magnitude of the current measured at each source. Although simple in construction and operation, surface capacitive type touch panels are unable to detect multiple simultaneous touch input events as occurs when, for example, two or more fingers are in contact with the touch panel.

Another well-known method of capacitive sensing applied to touch panels can be found in projected capacitive type touch panels (also known as mutual capacitance type touch panels). In this method, as shown in FIG. 2, a drive electrode 20 and sense electrode 21 are formed on a transparent substrate (not shown). The drive electrode 20 is fed with a changing voltage or voltage excitation signal by a voltage source 22. A signal is then generated on the adjacent sense electrode 21 by means of capacitive coupling via the mutual coupling capacitor 23 formed between the drive electrode 20 and sense electrode 21. When a conductive object such as a finger 13 is brought into the proximity of the electrodes, the magnitude of the mutual capacitance 23 is altered according to the distance between the conducting object and the electrodes. A current measurement means 24 is connected to the sense electrode 21 and provides a measurement of the size of the mutual coupling capacitor 23. A touch input event may therefore be detected by monitoring the output of the current measurement means 24. As is well-known, by arranging a plurality of drive and sense electrodes in an array, such as a two-dimensional matrix array, this projected capacitance sensing method may be used to form a touch panel device. An advantage of the projected (mutual) capacitance sensing method over the surface (self) capacitance method is that multiple simultaneous touch input events may be detected. The projected (mutual) capacitance sensing method is also suitable for detecting the proximity of non-conductive objects. In this case, the permittivity of the non-conductive object, if different from the permittivity of the air, results in a change in the magnitude of the mutual capacitance 23.

Although projected capacitive type touch panel devices such as those described above have been widely adopted in consumer electronic products, it is desirable to further improve their performance by addressing the current limitations of this sensing method. In particular, the accuracy at which the location of objects touching the touch panel surface can be determined and the minimum size of touching object are limited by the relatively low signal-to-noise ratio (SNR) of the mutual capacitance measurements. One known approach to increasing the SNR is to optimize the sensitivity of the touch panel to the proximity of an object, such as a finger or stylus, through the design of the touch panel electrodes. For example, U.S. Pat. No. 5,543,588 (Bisset et al, Aug. 6, 1996) discloses a touch panel comprising drive and sense electrodes patterned into diamond shapes. Alternatively, US Patent Application No. 2010/0302201 (Ritter et al, Dec. 2, 2010) discloses a touch panel comprising inter-digitated drive and sense electrodes which may be formed in a single physical layer. A disadvantage of increasing the sensitivity of the touch panel to the proximity of a conductive object in this way however is that the sensitivity of the touch panel to sources of electronic noise and interference may also be increased and the improvement in SNR that may be achieved by this approach is therefore limited.

Sources of noise contributing to the SNR include environmental effects such as changing temperature, humidity and condensation as well as electromagnetic interference emanating from the display device beneath the touch panel and from objects surrounding the device, including the touching object (s) itself. Noise from such sources may be manifested in the touch panel capacitance measurement circuits as correlated or predicable fluctuations in the measured signal. A second approach to increase the SNR is therefore to reduce the effects of these noise sources on the measurement. Typically, the display device is a significant source of interference and one well-known method to reduce the effect of this interference is to synchronize the timing of the display and touch panel functions such that the touch panel is only active to detect touch input when the display function is inactive, for example during the display horizontal or vertical blanking periods. However, such a method does not improve immunity to humidity, condensation or other environmental noise sources and may impose undesirable constraints on the operation of the touch panel and/or the display device which may limit the increase in SNR achievable.

Alternatively, US Patent Application 2009/0135157 (Harley, Nov. 27, 2007) and US Patent Application 2009/0194344 (Harley, Jan. 31, 2008) describe a mutual capacitance sensing device with an additional guard electrode to reduce the sensitivity of the system to humidity and condensation. As shown in FIG. 3, the guard electrode 30 is located between a drive electrode 31 and a sense electrode 32 and is connected to a fixed potential, such as the ground potential. A mutual coupling capacitance 35 that varies in the presence of a touching object, such as a finger 13, is formed between the drive electrode 31 and the sense electrode 32 and a guard capacitance 34 is formed between the guard electrode 30 and the drive electrode 31. As described above, a voltage stimulus 33 is applied to the drive electrode and a corresponding current is generated in the sense electrode 32 via the mutual coupling capacitance 35 and measured by a sensing circuit 36. The electrical coupling between the drive electrode 31 and sense electrode 32 may be affected by water or water vapour on the surface of the device. The guard electrode 30 and guard capacitance 34 act to reduce this coupling and, as a result, reduce the sensitivity of the capacitance sensing system to variations in humidity and condensation.

US Patent Application 2010/0079401 (Staton, Sep. 26, 2008) describes a mutual capacitance sensing device with an additional reference electrode to measure the noise injected by the touching object. As shown in FIG. 4, the device incorporates a drive electrode 40, a sense electrode 41 and the reference electrode 42. The electrodes are designed so that there is a large mutual coupling capacitance between the drive electrode 40 and the sense electrode 41 but a small mutual capacitive coupling between the drive electrode 40 and the reference electrode 42. Further, sense electrode 41 and reference electrode 42 are designed such that the capacitance between the sense electrode 41 and a touching object is the same as that between the reference electrode 42 and a touching object. Accordingly, the signal generated on the sense electrode 41 upon application of a voltage stimulus to the drive electrode 40 is larger than that generated on reference electrode 42 but the same amount of noise is injected by the touching object onto both the sense electrode 41 and reference electrode 42. The signal generated on the reference electrode 42 may therefore be subtracted from the signal generated on the sense electrode 41 to provide a measurement free from the noise injected by the touching object. However, the addition of the reference electrode into the touch panel reduces the spatial resolution of the touch panel and limits both the accuracy at which the location of the touching object may be calculated and the size of the touching object that may be detected.

Although the aforementioned methods reduce the effect of noise from selected sources, there are no known solutions to simultaneously eliminate the effects of noise from all significant sources. Also, the methods described above require the addition of electrodes into the touch panel device. This results in the added disadvantage that the spatial resolution, or accuracy at which the location of objects touching the touch panel surface can be determined, is reduced. A method of improving the immunity of a touch panel device to all significant noise sources without reducing the spatial resolution is therefore sought.

SUMMARY OF THE INVENTION

This invention describes a touch panel device which overcomes the aforementioned limitations of the prior art and provides improved noise immunity without a reduction in the accuracy at which the location of objects touching the touch panel surface may be determined.

A mutual capacitance type touch panel device is provided in accordance with the invention that includes an electrode array comprising drive electrodes, sense electrodes and reference electrodes. The reference and sense electrodes are arranged to simultaneously fulfil two sets of conditions. Firstly, the electrodes are arranged such that the mutual capacitance between the sense electrode and drive electrode varies with the proximity of a touching object whilst the mutual capacitance between the reference electrode and drive electrode does not. Secondly, the reference electrode and the sense electrode are designed to generate similar signals in response to electrical interference from the display device on which the touch panel is placed. Accordingly, noise immunity is improved and the effect of environmental conditions on the performance of the touch panel is reduced. As a result, the signal-to-noise ratio of the capacitance measurements in the touch panel system is increased and the accuracy at which the location of objects touching the touch panel surface may be determined is improved.

According to one aspect of the invention, a mutual capacitance touch panel device, includes: a substrate; an array of electrode elements formed on the substrate, each electrode element including a drive electrode, a sense electrode and a reference electrode, the reference electrode arranged between the drive electrode and the sense electrode; and a first mutual coupling capacitance formed between the drive electrode and the reference electrode of each electrode element, wherein the drive electrode and reference electrode are configured such that the first mutual coupling capacitance is substantially insensitive to an object touching the surface of the touch panel.

According to one aspect of the invention, the sense electrodes and reference electrodes of the array of electrode elements are arranged in a first direction, and the drive electrodes of the array of electrode elements are arranged in a second direction, wherein the second direction is orthogonal to the first direction.

According to one aspect of the invention, the device includes a second mutual coupling capacitance formed between the drive electrode and the sense electrode of each electrode element, wherein the drive electrode and sense electrode are configured such that the second mutual coupling capacitance varies with proximity of an object touching a surface of the touch panel.

According to one aspect of the invention, the device includes a sensing circuit electrically coupled to the array of electrode elements, the sensing circuit configured to measure the first and second mutual coupling capacitances.

According to one aspect of the invention, the reference electrode and the sense electrode of each electrode element are configured to generate substantially the same signals in response to electrical interference.

According to one aspect of the invention, the device includes a display device arranged relative to the touch panel device, wherein a first parasitic capacitance is formed between each sense electrode and the display device, and a second parasitic capacitance is formed between each reference electrode and the display device, and wherein an area of each sense electrode and an area of each reference electrode are substantially the same.

According to one aspect of the invention, the device includes a display device arranged relative to the touch panel device, wherein a first parasitic capacitance is formed between each sense electrode and the display device, and a second parasitic capacitance is formed between each reference electrode and the display device, and wherein an area of the sense electrode of each electrode element is different from an area of the reference electrode of the respective electrode element; and a weighting circuit operatively coupled to each electrode element, the weighting circuit configured to scale signals received by the sense and reference electrodes to compensate for a difference between the first and second parasitic capacitances.

According to one aspect of the invention, the reference electrode of each electrode element is patterned to surround the sense electrode of the respective electrode element and to occupy an area between the surrounded sense electrode and an adjacent drive electrode of the respective electrode element.

According to one aspect of the invention, the drive electrodes of the array of electrode elements are patterned into a series of connected diamonds.

According to one aspect of the invention, the drive, sense and reference electrodes of the array of electrode elements are patterned as at least one of rectangular rows and columns or tessellating shapes.

According to one aspect of the invention, the reference electrode of each electrode element is separated into a first reference electrode section and a second reference electrode section, the first reference electrode section arranged between the drive electrode and the sense electrode of the respective electrode element, and the second reference electrode section arranged within the sense electrode of the respective electrode element.

According to one aspect of the invention, a width of the first reference electrode section and a separation distance between the first reference electrode section and an edge of the drive electrode of each electrode element is configured such that all points on the first reference electrode section are substantially insensitive to an object touching the surface of the touch panel.

According to one aspect of the invention, a width of the second reference electrode section and a separation distance between the second reference electrode section and an edge of the drive electrode of each electrode element is configured such that all points on the second reference electrode section are substantially insensitive to an object touching the surface of the touch panel.

According to one aspect of the invention, a width of the sense electrode and a separation distance between the sense electrode and an edge of the drive electrode of each electrode element is configured such that all points on the sense electrode are sensitive to an object touching the surface of the touch panel.

According to one aspect of the invention, an area of the reference electrode and an area of the sense electrode of each electrode element are selected such that a parasitic capacitance of the reference electrode is substantially equal to a parasitic capacitance of the sense electrode.

According to one aspect of the invention, the device includes a sensing circuit, the sensing circuit configured to sample the first and second mutual coupling capacitances twice per sampling period.

According to one aspect of the invention, the sense electrode and the reference electrode of each electrode element are arranged such that a baseline value of the mutual capacitance between the drive electrode and sense electrode is substantially equal to the mutual capacitance between the drive electrode and the reference electrode of the respective electrode element.

According to one aspect of the invention, the device includes a host device coupled to the touch panel device.

According to one aspect of the invention, a method for forming a mutual capacitance touch panel device includes: forming an array of electrode elements on a substrate, each electrode element including a drive electrode, a sense electrode and a reference electrode, the reference electrode arranged between the drive electrode and the sense electrode, wherein each electrode element is arranged such that a first mutual coupling capacitance formed between the drive electrode and the reference electrode of the respective electrode element is substantially insensitive to an object touching the surface of the touch panel.

According to one aspect of the invention, forming the array of electrode elements includes arranging the sense electrodes and reference electrodes of the array of electrode elements in a first direction, and arranging the drive electrodes of the array of electrode elements in a second direction, wherein the second direction is orthogonal to the first direction.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1 shows a conventional surface capacitance sensor arrangement

FIG. 2 shows a conventional mutual capacitance sensor arrangement

FIG. 3 shows a conventional mutual capacitance sensor arrangement with an additional guard electrode FIG. 4 shows a conventional mutual capacitance sensor arrangement with an additional reference electrode

DESCRIPTION OF REFERENCE NUMERALS

Figure 5:
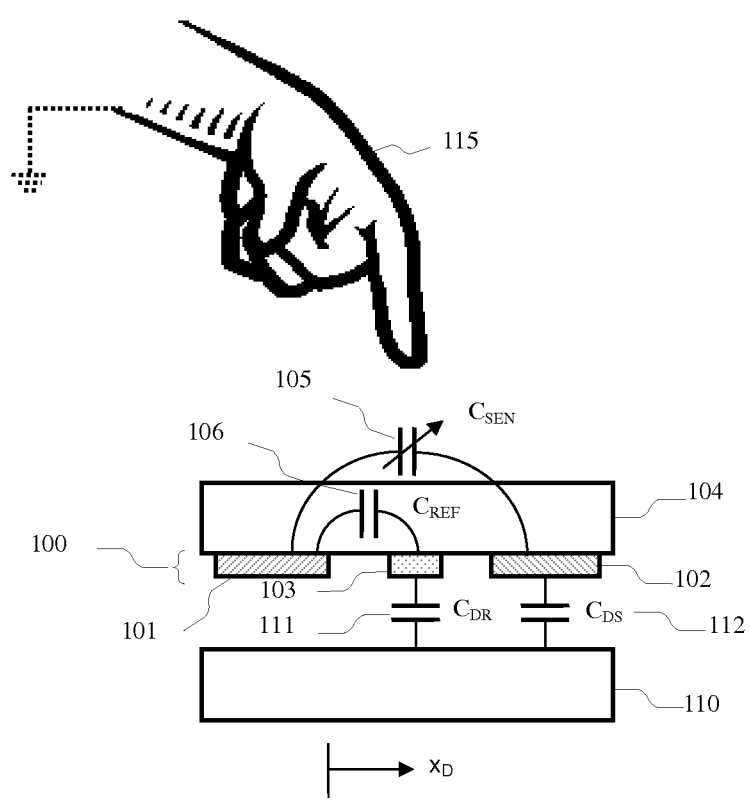
FIG. 5 shows an exemplary touch panel transducer structure in accordance with the invention

10 Substrate
11 Surface capacitance sensor electrode
12 Voltage source
13 Finger or other conductive object
14 Coupling capacitor
15 Current measurement apparatus
20 Drive electrode
21 Sense electrode
22 Voltage source
23 Coupling capacitor
24 Current measurement apparatus
27 First dynamic capacitor
28 Second dynamic capacitor
30 guard electrode
31 drive electrode
32 sense electrode
33 voltage stimulus
34 guard capacitance
35 mutual coupling capacitance
36 sensing circuit
40 drive electrode
41 sense electrode
42 reference electrode
100 electrode array
101 drive electrode
102 sense electrode
103 reference electrode
104 substrate
105 first mutual coupling capacitor
106 second mutual coupling
110 display device
111 first parasitic capacitor
112 second parasitic capacitor
116 set of drive electrodes
117 set of sense electrodes
118 set of reference electrodes
120 layer of transparent conductive material
121 metallization layer
122 electrically insulating layer
125 sensing circuit
130 switching circuit
131 first sampling switch
132 second sampling switch
133 third sampling switch
134 fourth sampling switch
140 differential integrator circuit
141 first operational amplifier
142 first integration capacitor
143 first reset switch
145 second operational amplifier
146 first integration capacitor
147 first reset switch
150 differential
151 operational amplifier
152 first input resistor
153 second input resistor
154 first feedback resistor
155 second feedback resistor
160 analogue to digital convertor
170 drive circuit
171 voltage generator unit
180 touch panel device
181 sense circuit block
182 driver circuit block
183 interface circuit
190 host device
191 display controller
201 drive electrode
202 sense electrode
203 reference electrode
204 first reference electrode section
205 second reference electrode section
230 switching circuit
231 first sampling switch
232 second sampling switch
233 third sampling switch
234 fourth sampling switch
400 electrode array
401 drive electrode
402 sense electrode pair
403 first dual-function electrode
404 second dual-function electrode
411 sense electrode pair
412 first dual-function electrode
413 second dual-function electrode
414 first connecting wire
415 second connecting wire
416 contact hole
420 transparent conductive layer
421 electrically insulating layer
425 sensing circuit
430 switching circuit
431 first sampling switch
432 second sampling switch
433 third sampling switch
434 fourth sampling switch
435 fifth sampling switch
436 sixth sampling switch
440 differential integrator circuit
450 differential amplifier circuit
460 analog-to-digital convertor
470 drive circuit
481 sense electrode pair
482 first dual-function electrode
483 second dual-function electrode
484 first narrow section
485 second narrow section

DETAILED DESCRIPTION OF INVENTION

This invention describes a touch panel device which overcomes the aforementioned limitations of the prior art and provides improved noise immunity without a reduction in the accuracy at which the location of objects touching the touch panel surface may be determined.

In accordance with a first and most general embodiment of a first aspect of the invention, a mutual capacitance type touch panel device is provided that includes an electrode array comprising at least one each of a drive electrode, sense electrode and reference electrode Signals applied to the drive electrodes are capacitively coupled to the sense electrodes, the current generated on which can be monitored to provide a measure of said coupling capacitance. The reference electrodes provide a measure of the noise signal generated on the sense electrodes and may be used to increase the signal-to-noise ratio of the current measurement, as will be described. FIG. 5 shows an exemplary arrangement of the electrode array 100 with drive electrode 101, sense electrode 102 and reference electrode 103 formed on a substrate 104. A first mutual coupling capacitor ($C_{SEN}$) 105 is formed between the drive electrode and sense electrode and a second mutual coupling capacitor ($C_{REF}$) 106 is formed between the drive electrode and reference electrode. The touch panel may also be arranged above a display device 110, for example a liquid crystal display device, such that a first parasitic capacitor ($C_{DS}$) 111 is formed between the sense electrode 102 and the display device 110 and a second parasitic capacitor ($C_{DR}$) 112 is formed between the reference electrode 103 and the display device 110. In order to provide improved noise immunity, the electrodes are arranged to simultaneously fulfil two sets of conditions.

Figure 6:
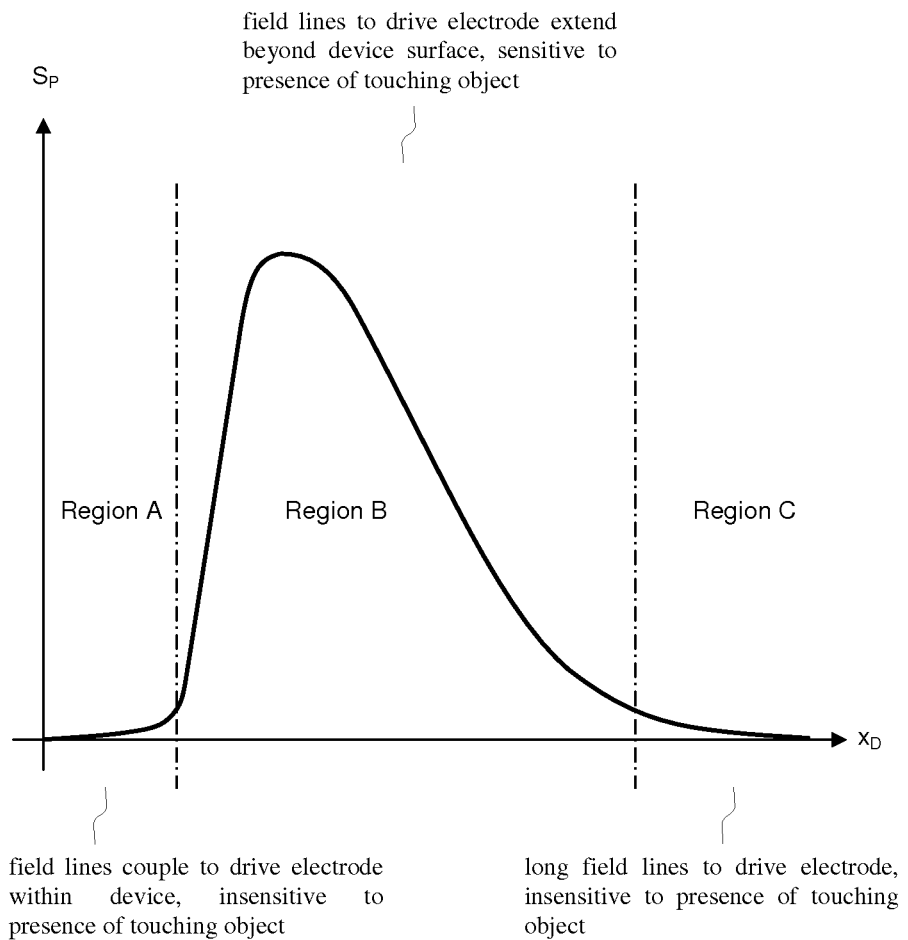
FIG. 6 shows the relationship between a location on the surface of the touch panel and the sensitivity of that location to the proximity of a touch object

Firstly, the electrodes are arranged such that the capacitance of the first mutual capacitor 105 varies with the proximity of a touching object 115, such as a finger, to the surface of the device (i.e., the first mutual capacitor is "sensitive" to the proximity of the touching object relative to the surface of the device) whilst the capacitance of the second mutual capacitor 106 is substantially insensitive to the presence of the touching object 115. That is to say, the change in capacitance of the second mutual capacitor 106 due to the presence of a conductive object may be less than 10% of the corresponding change in capacitance of the first mutual capacitor 105. Non-conductive objects in proximity to the surface of the touch panel may result in similar changes in capacitance provided that the permittivity of the non-conductive object is not equal to the permittivity of air. The above condition may be achieved in accordance with the method now described. FIG. 6 illustrates the relationship between the sensitivity, $S_P$, of a point in the plane of an electrode array to the distance, $x_D$, between that point and the edge of the drive electrode. Electric field lines between points close to the display electrode edge and the display electrode (Region A) do not extend beyond the surface of the device with the result that an electrode—such as the reference electrode—including such points is insensitive to the presence of a touching object. As the point is moved further from the display electrode edge (Region B), field lines from it to the display electrode begin to extend beyond the touch panel surface with the result that an electrode including such points has increased sensitivity to the touching object. For points further distant from the display electrode edge (Region C), the sensitivity to the touch object begins to decrease again as the capacitance associated with long field lines is small. Accordingly, the second mutual capacitor 106 may be made insensitive to the presence of a touching object by ensuring that the reference electrode 103 is located entirely in Region A or Region C. However, if the reference electrode 103 is located in Region C it must necessarily be located far from the drive electrode 101 and therefore has the disadvantage that the spatial resolution of the touch panel device is reduced. Conversely, locating the reference electrode 103 in Region A ensures the second mutual capacitor 106 is insensitive to the presence of a touching object (since all of the electric field lines that emanate from the drive electrode 101 couple to each point on the reference electrode 103 within the substrate 104 and do not extend beyond substrate surface) and allows the spatial resolution of the touch panel device to be maintained. The width of the reference electrode 103 and the separation between the drive electrode 101 and reference electrode 103 may be chosen in conjunction with the distance between the plane of the electrode array 100 and the surface of the substrate 104 so that this condition is fulfilled.

Secondly, in order that the noise injected by the display device 110 and touching object 115 onto the reference electrode 103 is the same as that injected onto the sense electrode 102, the reference electrode 103 and sense electrode 102 are designed to have substantially the same parasitic capacitance components. That is to say, the difference in the total parasitic capacitances between a reference electrode 103 and the display and a sense electrode 102 and the display may be less than 1%. For example, if the first parasitic capacitor 111 has the same capacitance as the second parasitic capacitor 112 then the noise injected by the display device 110 onto each of the reference and sense electrodes will be equal. This may be achieved, for example, by setting the area of the reference electrode 103 to be the same as the area of the sense electrode 102. Advantageously, by setting the areas of the reference electrode 103 and sense electrode 102 to be substantially equal (i.e. to result in substantially the same parasitic capacitances, as defined above), the noise injected by the touching object 115 onto the reference electrode 103 and onto the sensing electrode 102 will also be equal.

In practise it may not be possible to simultaneously meet both the first and second conditions by design of the sense and reference electrode patterns alone. For example, in order to ensure that the reference electrode is insensitive to the presence of a touching object, it must typically be made narrow and located close to the drive electrode. Further, in order to maximise the sensitivity of the sense electrode to the presence of a touching object, it is advantageous to make the sense electrode wide. It may therefore be disadvantageous to set the area of the reference electrode 103 to be the same as the area of the sense electrode 102 and the second parasitic capacitance, $C_{DR}$, may therefore not be equal to the second parasitic capacitance, $C_{DS}$. Accordingly, in an alternative arrangement, the area of the reference electrode 103 may be different from the area of the sense electrode 102 and the effect of noise injected by the display device 110 and touching object 115 may be made equal by weighting the output signals generated on the reference and sense electrodes and by subsequently calculating the difference between these weighted outputs. Weighting of the output signals may be performed, for example, by the differential amplifier 150 as described in more detail below.

When the electrode array 100 is arranged as described, the reference electrode 103 both acts as a guard—minimizing direct coupling from the drive electrode 101 to the sense electrode 102—and receives the same noise from the display device 110 and the touching object 115 as the sense electrode 102. To measure the proximity of a touching object and detect a touch event, a voltage stimulus is applied to the drive electrode 101 which causes charge to be transferred to the reference electrode 103 and sense electrode 102. This transfer of charge may generate a current in each electrode that is measurable by an attached sensing circuit. The current generated on the reference electrode 103 may be subtracted from that generated on the sense electrode 102 by the sensing circuit to give a measurement of the second mutual capacitor 106 that is immune to the effects of noise injected from the display device 110, noise injected from the touching object 115 and to the effects of changing environmental conditions such as humidity and condensation.

Figure 7A:
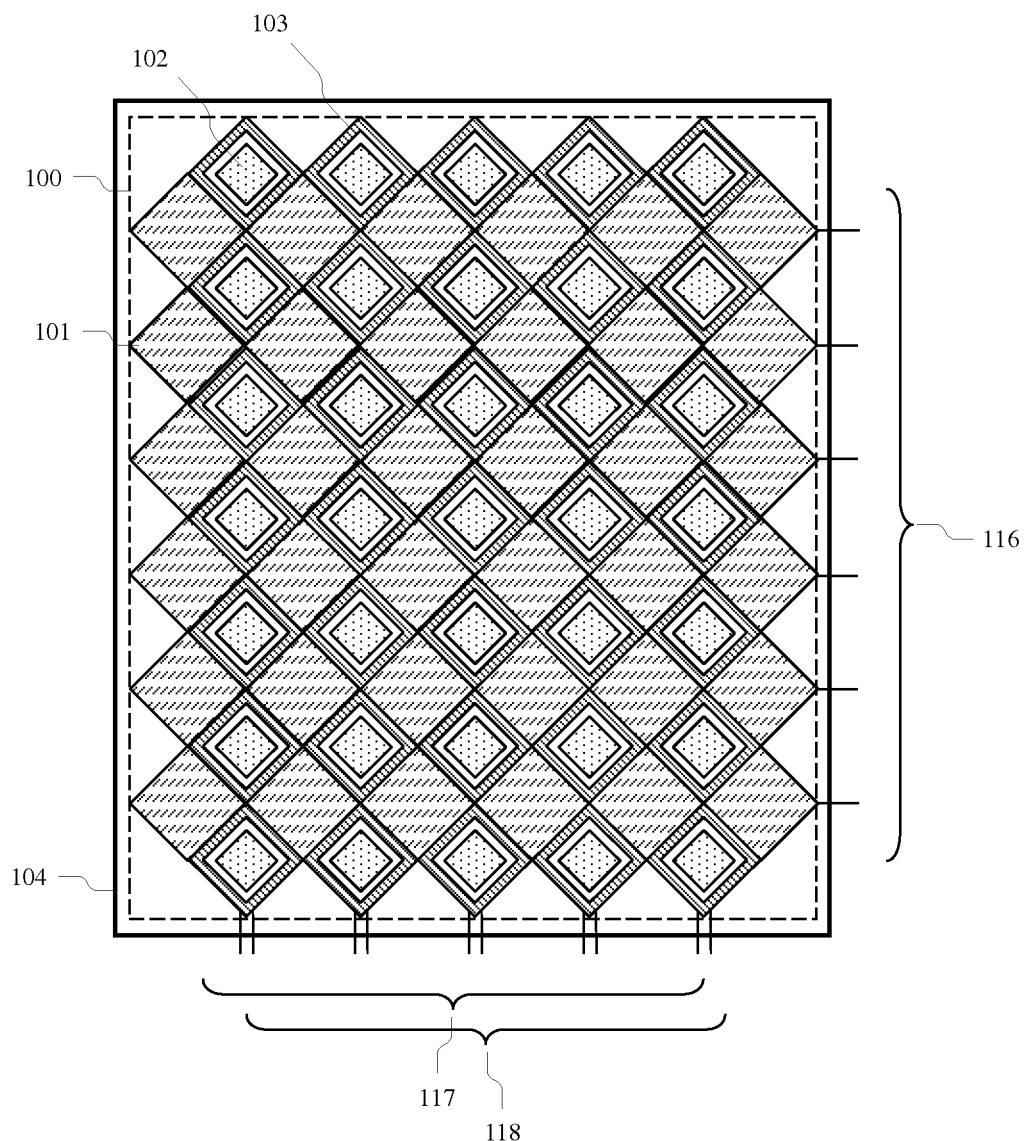
FIG. 7A shows a plan view of an exemplary electrode pattern in accordance with a first embodiment of the invention
Figure 7B:
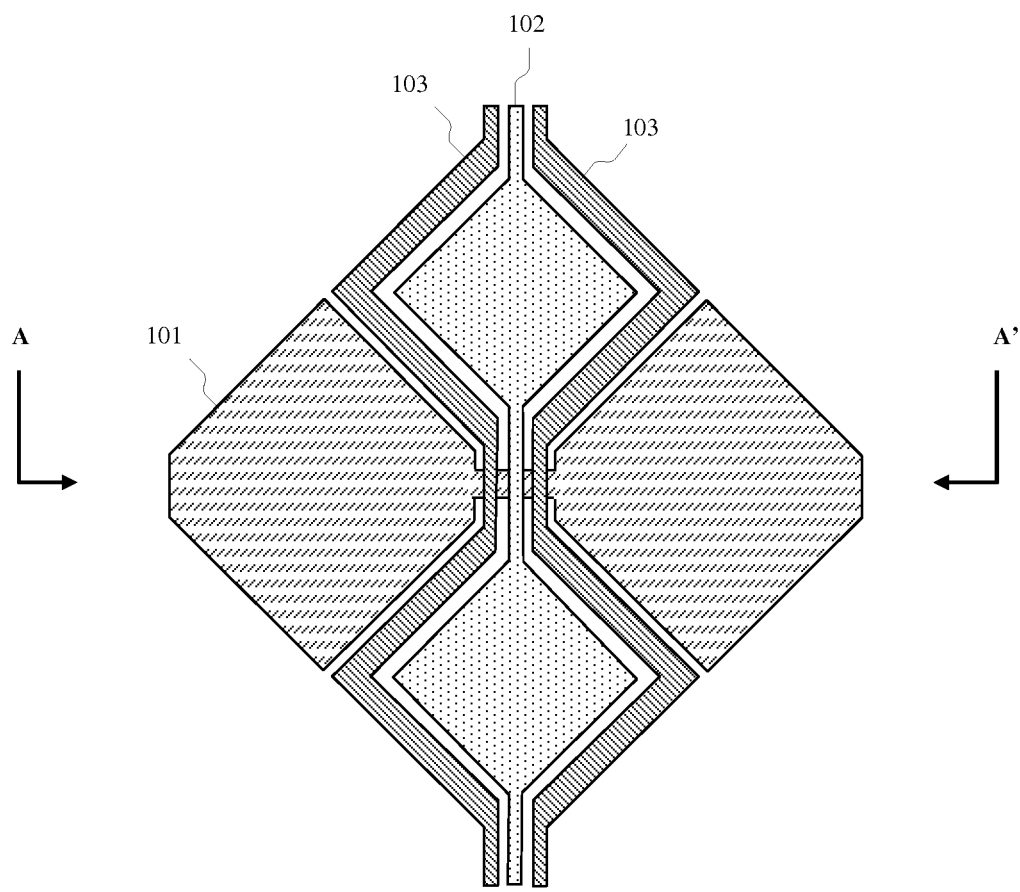
FIG. 7B shows the detail of exemplary electrodes patterned in accordance with a first embodiment of the invention
Figure 7C:
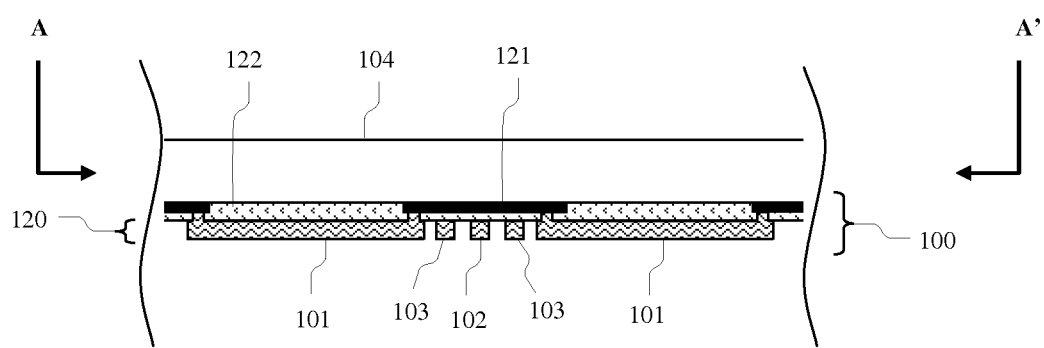
FIG. 7C shows the cross-section of an exemplary electrode array in accordance with a first embodiment of the invention

An example of an electrode array with a set of drive electrodes 116 a set of sense electrodes 117 and a set of reference electrodes 118 that meet the two conditions stated above is shown in FIG. 7A and FIG. 7B. Each electrode may be formed on the substrate 104 using standard photolithographic or printing techniques in a transparent conducting material, such as for example Indium-Tin Oxide (ITO), Indium Zinc Oxide (IZO) or a conductive polymer. The set of sense electrodes 117 is arranged in first direction, for example forming columns of the electrode array 100. The set of reference electrodes 118 may be arranged parallel to the set of sense electrodes 117 in the column direction and the set of drive electrodes 116 may be arranged in a perpendicular direction to the set of sense electrodes 117, for example forming rows of the electrode array 100. Each drive electrode 101 in the set of drive electrodes 116 and each sense electrode 102 in the set of sense electrodes 117 are patterned into a series of connected diamonds. Alternatively, the drive electrodes 101 and sense electrodes 102 may be patterned as simple rectangular rows and columns or as other tessellating shapes to improve the signal-to-noise ratio (SNR) of the display. Each reference electrode 103 in the set of reference electrodes 118 is patterned to surround one sense electrode 102 and to occupy the gap between said sense electrode 102 and drive electrodes 101. To avoid electrical contact between the drive electrodes 101 and the sense electrodes 102 or reference electrodes 103, the drive electrodes 101 may be formed on the substrate 104 in a first layer of transparent conductive material and the sense electrodes 102 and reference electrodes 103 formed in a second layer of transparent conductive material above the first layer and separated from it by an electrically insulating layer. Such a structure is well-known in the manufacture of capacitive touch panel devices. Alternatively, as shown in FIG. 7C, in another process well-known in the manufacture of capacitive touch panel devices, the drive electrodes 101, sense electrodes 102 and reference electrodes 103 may be formed in the same layer of transparent conductive material 120 and an additional metallization layer 121 used to form bridges to interconnect separate regions of the drive electrode 101. Electrical isolation of the drive electrodes 101 from the sense electrodes 102 and reference electrodes 103 is achieved by forming an electrically insulating layer 122 between the metallization layer 121 and the layer of transparent conductive material 120.

Figure 8:
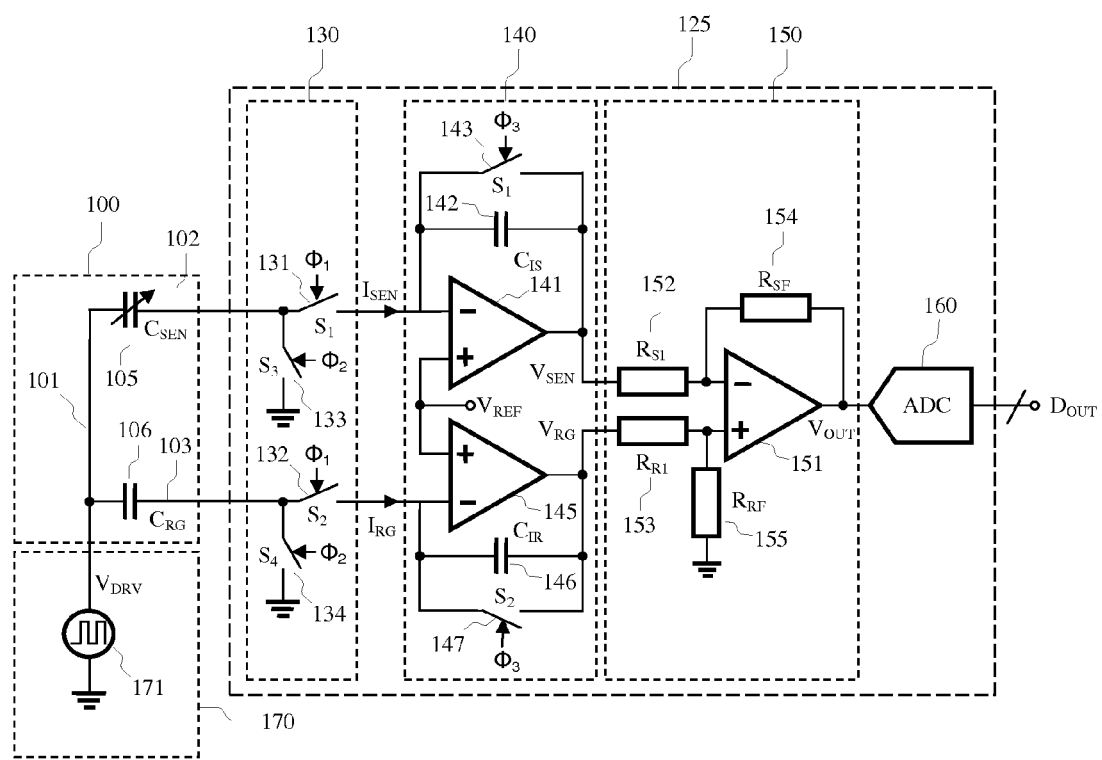
FIG. 8 shows an exemplary circuit in accordance with a first embodiment of the invention for measuring mutual capacitance

A sensing circuit may be used to measure the first and second mutual capacitances 105, 106. The sensing circuit may be based on a conventional charge-transfer method or may alternatively utilise other known mutual capacitance measurement techniques. The schematic diagram of an example sensing circuit 125 suitable for measuring the capacitances of the electrode array 100 and using the charge-transfer method is shown in FIG. 8. The sensing circuit 125 may comprise a switching circuit 130, a differential integrator circuit 140, a differential amplifier 150 and an analogue to digital convertor (ADC) 160. The switching circuit includes first and second sampling switches (S1, S2) 131, 132 that are controlled by a first switch control signal, $\phi_1$, and third and fourth sampling switches (S3, S4) 133, 134 that are controlled by a second switch control signal, $\phi_2$. The differential integrator circuit 140 may be of a well-known design, for example including a first operational amplifier 141 with a first integration capacitor ($C_{IS}$) 142 and a first reset switch (S5) 143 and a second operational amplifier 145 with a second integration capacitor ($C_{IR}$) 146 and a second reset switch 147. The first and second reset switches 143, 147 may be controlled by a third switch control signal, $\phi_3$. As an alternative, the first and second operational amplifiers 141, 145 of the differential integrator 140 may be replaced by a single fully differential operational amplifier. The differential amplifier circuit 150 may be of a well-known type and may, for example, further comprise an operational amplifier 151, first and second input resistors ($R_{S1}$, $R_{S2}$) 152, 153 and first and second feedback resistors ($R_{SF}$, $R_{RF}$) 154, 155.

In order to cancel the effect of noise injected from the display device 110 and from the touching object 115, the resistance ratios $R_{RF}/R_{R1}$ and $R_{SF}/R_{S1}$ that set the gain for the positive and negative input paths of the differential amplifier 150 are chosen with respect to the ratio of the first and second parasitic capacitances, $C_{DS}$, $C_{DR}$. For example, given a parasitic capacitance weighting factor, $\beta$, where $\beta = C_{DS}/C_{DR}$ then $$R_{RF}/R_{R1} = \beta \cdot R_{SF}/R_{S1}$$

Figure 9:
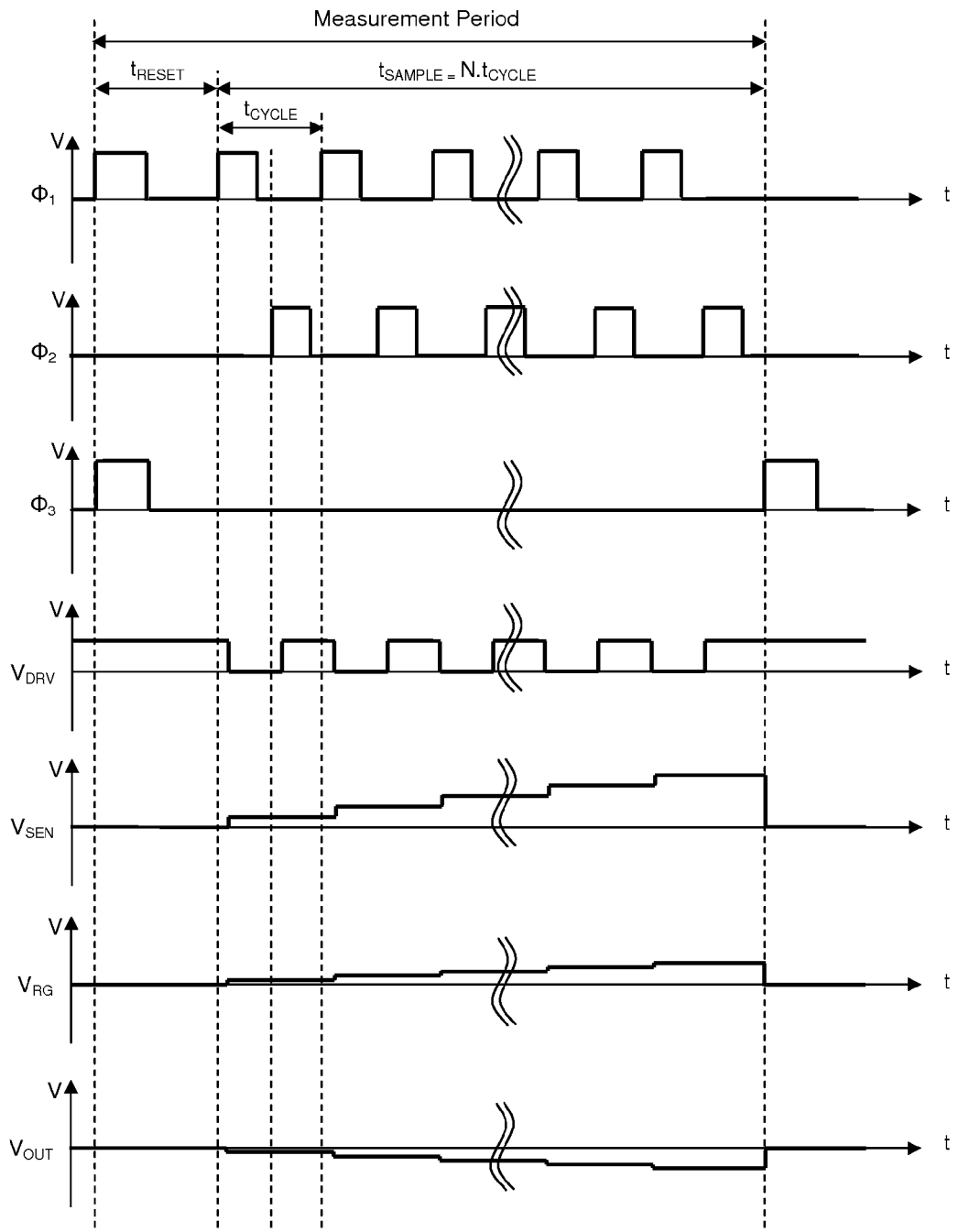
FIG. 9 shows a waveform timing diagram illustrating the operation of a first embodiment of the invention

In addition to the electrode array 100 and sensing circuit 125, the touch panel device also includes a drive circuit 170 comprising a voltage generator unit 171 that may be arranged to generate a voltage stimulus, $V_{DRV}$, such as a voltage pulse train. The operation of the touch panel device is now described with reference to the schematic diagram of FIG. 8 and the waveform diagram shown in FIG. 9. In a first reset stage at the start of the measurement period, the third switch control signal, $\phi_3$, is made active causing the first and second reset switches 142, 147 of the differential amplifier to close. The negative input terminals of the first and second operational amplifiers 141, 145 are now connected to the output terminals of their respective amplifiers and assume a voltage equal to the reference voltage supplied to the positive terminals of the amplifiers, $V_{REF}$, which may be a fixed constant voltage such as the ground potential. The differential integrator circuit 140 is now in its reset state. The first switch control signal, $\phi_1$, is also made active during the reset period causing the first and second sampling switches 131, 132 of the switching circuit 130 to close. The sense electrode 102 and reference electrode 103 are therefore also reset to the reference voltage, $V_{REF}$.

In a second sampling stage, the first to fourth sampling switches 131, 132, 133, 134 of the switching circuit 130 are controlled with respect to the voltage stimulus, $V_{DRV}$, to transfer charge from the electrode array to the differential integrator circuit 140. The sampling stage is divided into a number of sampling cycles. After the second switch control signal has been made inactive, the first switch control signal is then activated causing the first and second sampling switches 133, 134 to close. The sense electrode 102 is now connected to the negative input terminal of the first operational amplifier 141 and the reference electrode 103 to the negative input terminal of the second operational amplifier 142. The voltage generator unit 171 of the drive circuit 170 now changes the voltage of the voltage stimulus, $V_{DRV}$, applied to the drive electrode 101 and causes charge to be transferred via the electrode array 100 and switching circuit 130 to the input terminals of the differential integrator circuit 140. The charge transferred via the first mutual capacitor 105 is integrated onto the first integration capacitor 142 and causes the output of the first operational amplifier, $V_{SEN}$ to increase in proportion to the capacitance, $C_{SEN}$, of the first mutual capacitor 105. The charge transferred via the second mutual capacitor 106 is integrated onto the second integration capacitor 146 and causes the output of the second operational amplifier, $V_{RG}$ to increase in proportion to the capacitance, $C_{RG}$, of the second mutual capacitor 105. The differential amplifier 150 subtracts some multiple of the output voltage, $V_{SEN}$, of the first operational amplifier 141 from some multiple of the output voltage, $V_{RG}$, of the second operational amplifier 145. These multiples are set by the resistance ratios $R_{RF}/R_{R1}$ and $R_{SF}/R_{S1}$ which are chosen with respect to the parasitic capacitance weighting factor, $\beta$, as described above. The first switch control signal, $\phi_1$, is now deactivated and the second switch control signal, $\phi_2$, is made active. This causes the third and fourth sampling switches 133, 134 to close and thereby set the voltage of the sense and reference electrodes 102, 103 to be equal to the ground potential. Finally, the voltage generator unit 471 returns the voltage of the voltage stimulus, $V_{DRV}$, to its original potential. Any charge transferred from the drive electrode 101 to the sense electrode 102 or reference electrode 103 via the electrode array 100 due to this voltage change is discharged via the third and fourth sampling switches 133, 134.

This sampling cycle is repeated N times during the sampling period such that the total sampling time, $t_{SAMPLE}=N \cdot t_{CYCLE}$ where $t_{CYCLE}$ is the time for one sampling cycle. At the end of the sampling period, the final output voltage, $V_{OUT}$, of the differential amplifier is therefore proportional to the weighted difference between the capacitances of the first and second mutual capacitors 105, 106 and is free from the effects of noise injected onto the sense and reference electrodes. The analog-to-digital converter circuit 160 converts this final differential amplifier output voltage, $V_{OUT}$, into a digital value, $D_{OUT}$, suitable for further processing to extract the location of objects touching the surface of the touch panel device.

Figure 10:
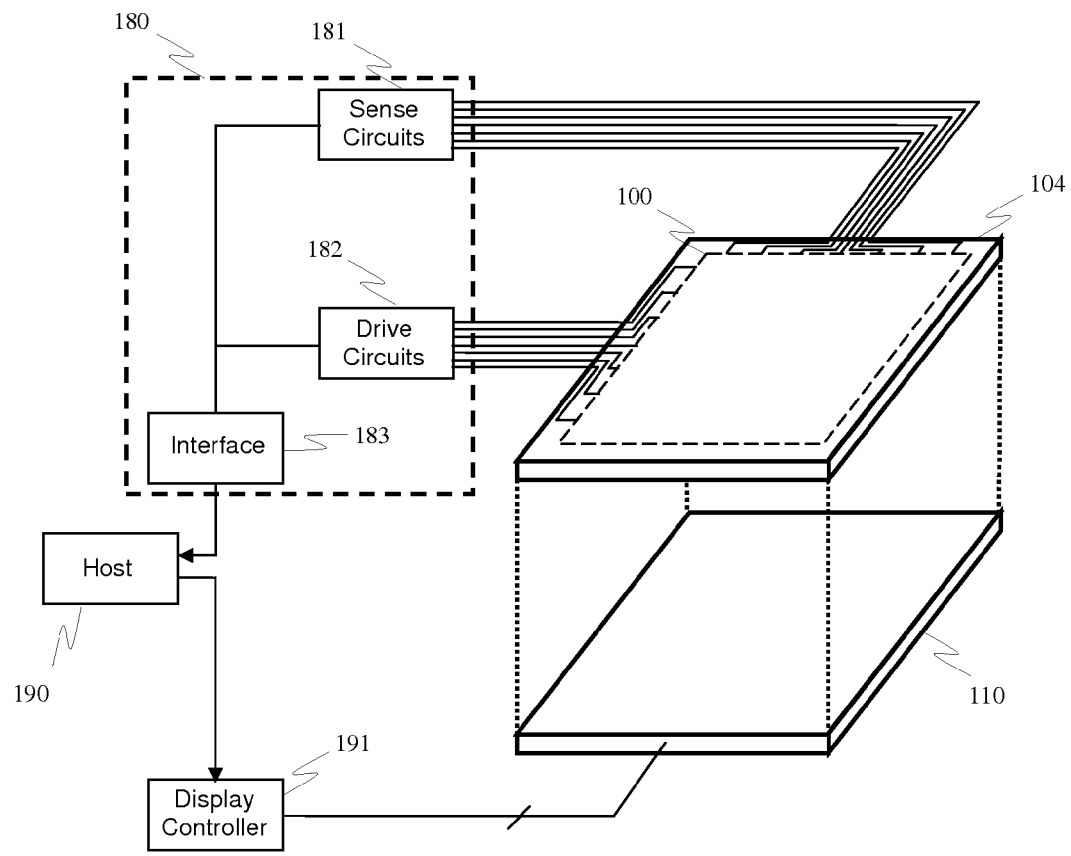
FIG. 10 shows a block diagram of an exemplary touch panel system in accordance with a first embodiment of the invention

A touch panel device utilising the electrode array and circuits described above is shown in FIG. 10. The touch panel device 180 is connected to a host device 190—for example a mobile phone, Tablet PC or the like—and comprises a sense circuit block 181, driver circuit block 182 and an interface circuit 183. The sense circuit block 181 may further comprise a plurality of sense circuits 125 and the drive circuit block 182 may further comprise a plurality of drive circuits 170. The sense circuit block 181 may contain as many sense circuits 125 as there are sense electrodes in the electrode array 100. The drive circuit block 182 may contain as many drive circuits 170 as there are drive electrodes in the electrode array 100. In order to measure the mutual capacitance associated with each intersection of drive electrode and sense electrode, the operation method for one measurement period described above may be repeated for each drive electrode in the array. For example, the voltage stimulus, $V_{DRV}$, may be applied in successive measurement periods to each drive electrode in the electrode array in turn. The interface circuit 183 may generate signals to control the operation of the sense circuit block 181 and drive circuit block 182. The interface circuit 183 may also receive the digital output signals from the drive circuit block 182, calculate the location of objects touching the surface of the touch panel device from this and communicate this result to the host device 190. The host device may then update the image shown on the display device 110 in accordance with the result via a display controller 191.

A limitation of the reference electrode design illustrated in FIG. 7A, FIG. 7B and FIG. 7C is that, even if noise injected from the display device couples equally to both the sense electrode and reference electrode, noise injected from the touching object may not. For example, depending on the location and size of the touching object, the ratio of the parasitic capacitances formed between the object and the sense and reference electrodes ($C_{OS}$, $C_{OR}$) may not be the same as the ratio of the parasitic capacitances formed between the display device and the sense and reference electrodes ($C_{DS}$, $C_{DR}$), i.e. $C_{OS}/C_{OR} \ne C_{DS}/C_{DR}$. Further, if the areas of the sense and reference electrodes are weighted such that $C_{DS}=\beta \cdot C_{DR}$ then any difference in the injected noise will be multiplied by the weighting factor $\beta$ in the sense circuit.

Figure 11A:
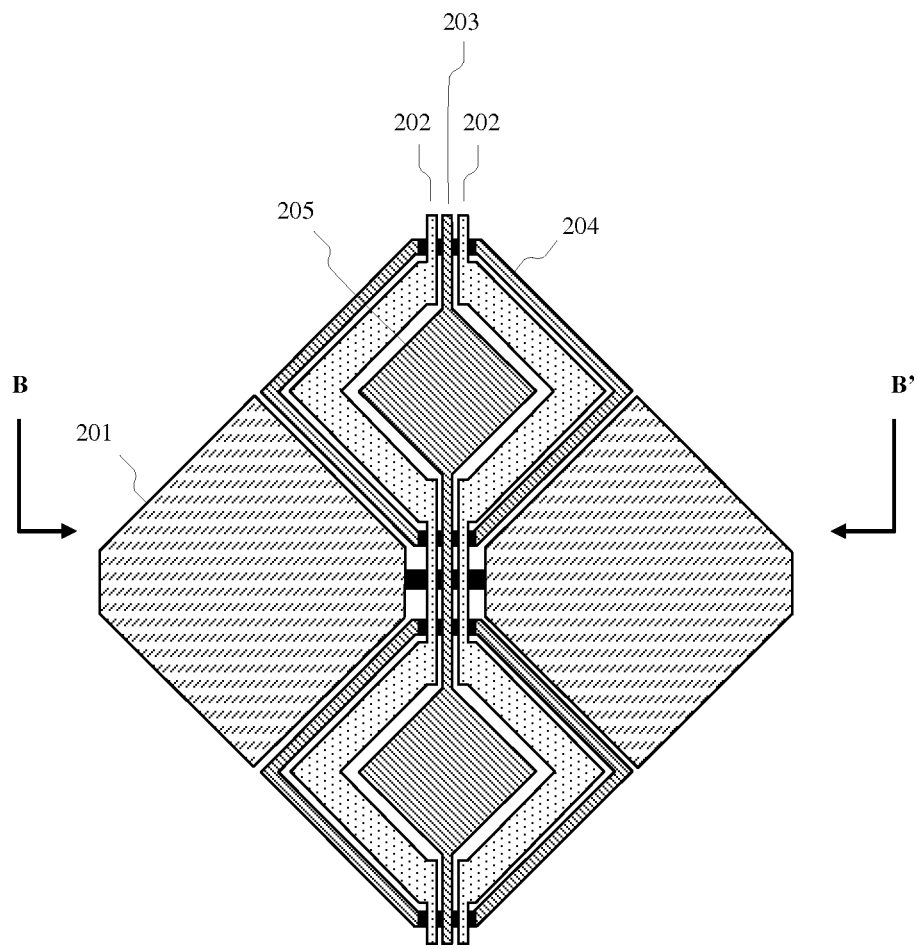
FIG. 11A shows the detail of exemplary electrodes patterned in accordance with a second embodiment of the invention
Figure 11B:
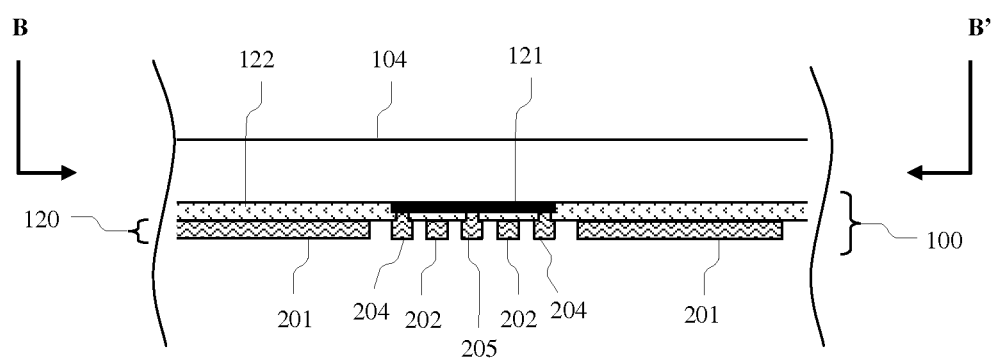
FIG. 11B shows the cross-section of an exemplary electrode array in accordance with a second embodiment of the invention

Accordingly, in a touch panel device in accordance with a second embodiment of the invention, sense and reference electrodes with improved noise immunity are provided. FIG. 11A shows an exemplary arrangement of drive electrode, sense electrode and reference electrode in accordance with the present embodiment. Although the arrangement of this example is based on a conventional tessellating diamond pattern, the concept described herein is applicable to other known pattern types. The reference electrode 203 is separated into first reference electrode section 204 that is located between the drive electrode 201 and sense electrode 202 and a second reference electrode section 205 that is located in the centre of the sense electrode 202 and completely surrounded by it. The sense electrode is therefore located between and separated from the first reference electrode section 204 and second reference electrode section 205. FIG. 11B shows a cross-section of an electrode array 100 including said arrangement of electrodes wherein the drive electrodes 201, sense electrodes 202 and reference electrodes 203 may be formed in the same layer of transparent conductive material 120 and an additional metallization layer 121 used to form bridges to interconnect separate regions of the drive electrode 101 and to connect the first reference electrode section 204 to the second reference electrode section 205.

The width of the first reference electrode section 204 and its separation from the drive electrode edge may be arranged such that all points on the section are insensitive to the presence of a touching object (corresponding to Region A in FIG. 6). The width of the second reference electrode section 205 and its separation from the drive electrode edge may also be arranged such that all points on the section are substantially insensitive to the presence of a touching object (corresponding to Region C in FIG. 6). The width of the sense electrode 202 and its distance from the drive electrode edge may be arranged such that all points on the electrode are substantially sensitive to the presence of a touching object (corresponding to Region B in FIG. 6). Further the area of the reference electrode 203 and sense electrode 202 may be chosen in totality such that the components of their parasitic capacitance to the touching object and display device are equal i.e. $C_{OS}=C_{OR}$ and $C_{DS}=C_{DR}$. The first reference electrode section 204 therefore acts as a guard to minimize direct coupling from the drive electrode 201 to the sense electrode 202. Since the parasitic components of the sense electrode 202 and reference electrode 203 are matched, there is no need for any weighting to be applied by the sensing circuit. The second reference electrode section 205 therefore acts together with the first reference electrode section 204 to provide a reference that may be used to accurately cancel the noise injected onto the sense electrode regardless of the position of the touching object. The touch panel device is therefore immune to electrical interference from changing environmental conditions, the display device and nearby objects.

Figure 12:
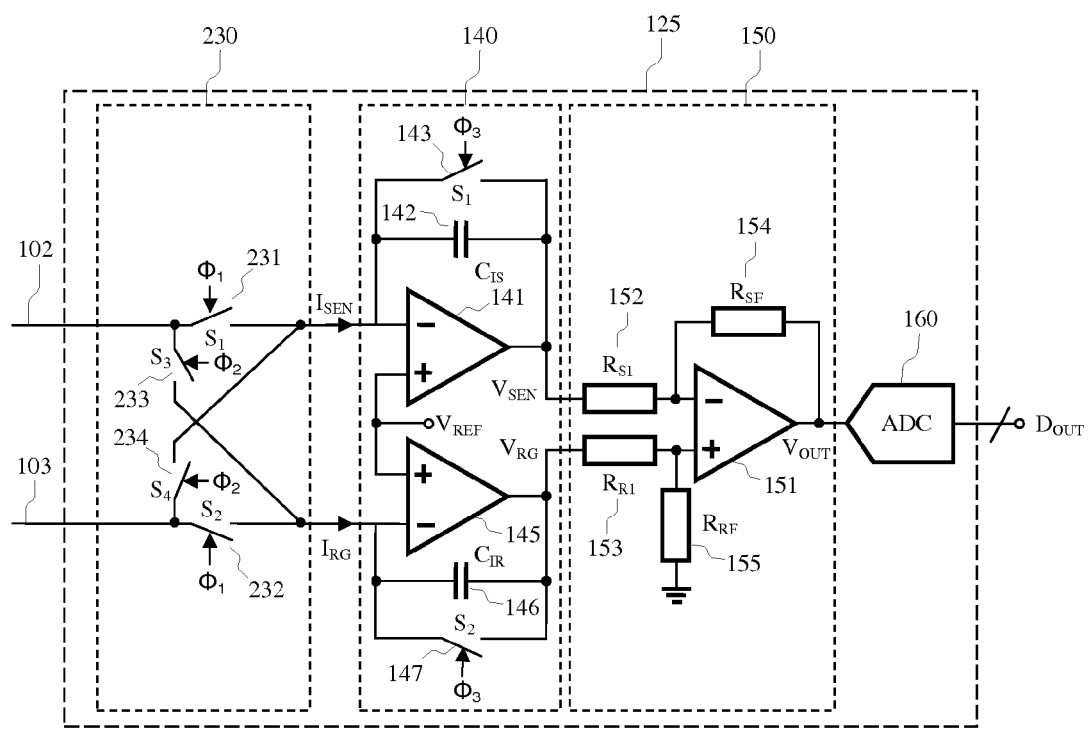
FIG. 12 shows an exemplary circuit in accordance with a third embodiment of the invention for measuring mutual capacitance
Figure 13:
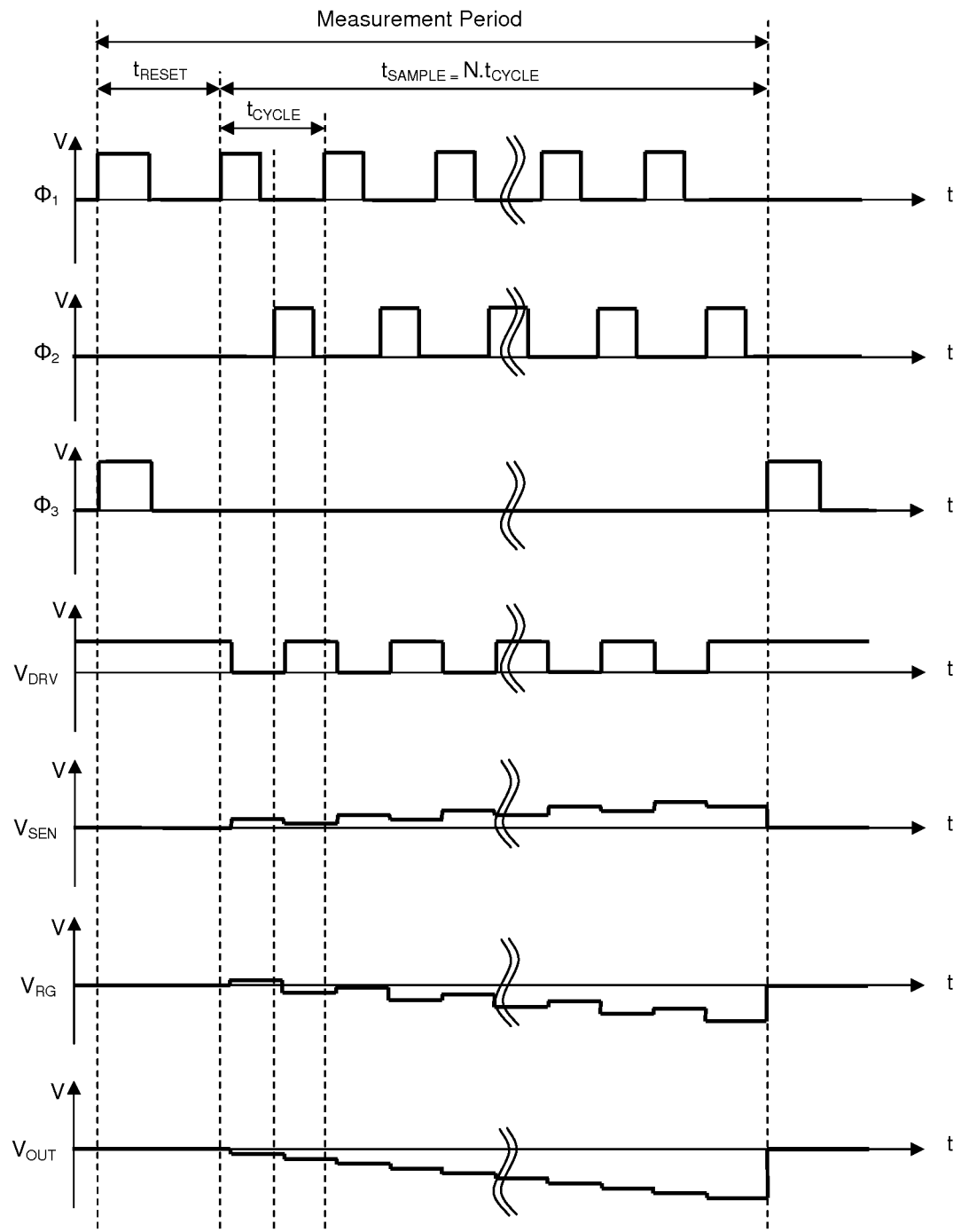
FIG. 13 shows a waveform timing diagram illustrating the operation of a third embodiment of the invention

A touch panel device in accordance with a third embodiment of the invention includes a sensing circuit that enables the SNR of the mutual capacitance measurement to be further increased. As shown in FIG. 12, the sensing circuit 125 includes a switching circuit 230 that further comprises first to fourth sampling switches (S1-S4) 231, 232, 233, 234. The operation sequence of the switching circuit 230 is similar to that described above for the switching circuit 130 of the first embodiment. However, in the switching circuit 230 of the present embodiment, the first and third sampling switches 231, 233 are arranged to connect the sense electrode 102 to a first input terminal of the differential integrator 140—for example the negative input terminal of the first operational amplifier 141—when a first switch control signal, $\phi_1$, is active and to a second input terminal of the differential integrator 140—for example the negative input terminal of the second operational amplifier 145—when a second switch control signal, $\phi_2$, is active. The second and fourth sampling switches 232, 234 are arranged to connect the reference electrode 103 to the second input terminal of the differential integrator 140 when a first switch control signal, $\phi_1$, is active and to the first input terminal of the differential integrator 140 when a second switch control signal, $\phi_2$, is active. As illustrated in FIG. 13, during each sampling cycle of the sampling period, the first and second mutual coupling capacitors 105, 106 are sampled twice: once on the falling edge of the voltage stimulus, $V_{DRV}$, and once on the rising edge. By alternate application of the switch control signals, $\phi_1$, $\phi_2$, as shown the voltages, $V_{SEN}$, $V_{RG}$, at each output terminal of the differential integrator circuit 140 are therefore incremented (or decremented) during the sampling cycle by an amount proportional to the difference between the first and second mutual coupling capacitors 105, 106. Since two samples are taken during each sampling cycle and since many more samples may now be made without the operational amplifiers reaching saturation, the SNR of the sensing circuit is improved.

However, even though it is now only the difference between the first and second mutual coupling capacitors 105, 106 that is being measured, saturation may still occur in the sensing circuit if the baseline capacitance (i.e. the capacitance when no touching object is in the proximity of the touch panel) of the first and second mutual capacitors is significantly different—for example when the difference in baseline capacitance is similar to the maximum difference that is expected to be caused by a touching object. Although one solution to this problem is to account for this baseline by increasing the range of capacitances that may be measured, this is undesirable since it must be done by reducing the sensitivity of the sensing circuit and hence reducing the SNR. In accordance with a fourth embodiment of the invention, the sense electrode and reference electrode are additionally arranged such that the baseline value of the mutual capacitance between the drive electrode and sense electrode is substantially equal to that of the mutual capacitance between the drive electrode and reference electrode (i.e., the difference in the mutual capacitances between the reference electrode and the drive electrode and between the sense electrode and the drive electrode may be less than 1%). In such an arrangement, only the difference in the signal capacitance (i.e. the change in capacitance caused by an object in proximity to the touch panel) is measured by the sensing circuit. The number of sampling cycles may therefore be increased without saturation of the sensing circuit and the SNR of the touch panel is improved.

Figure 14A:
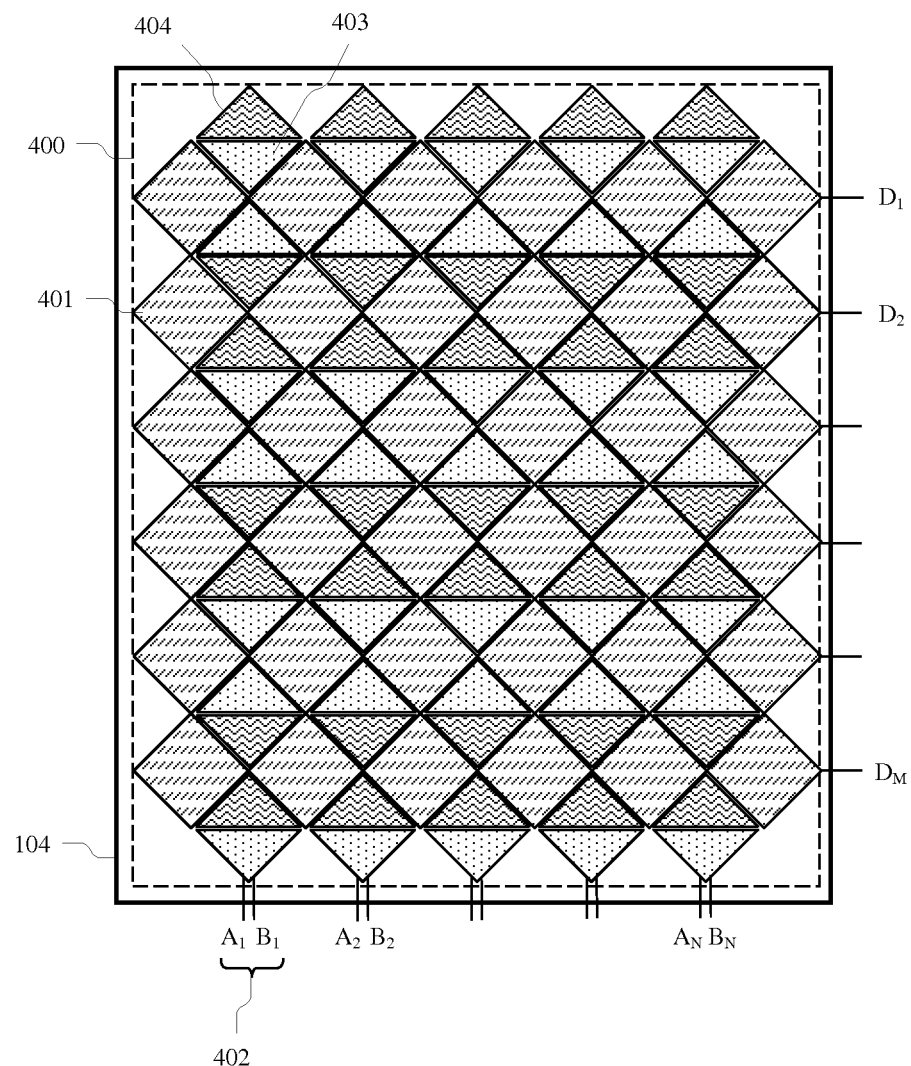
FIG. 14A shows a plan view of an exemplary electrode pattern in accordance with a fifth embodiment of the invention
Figure 14B:
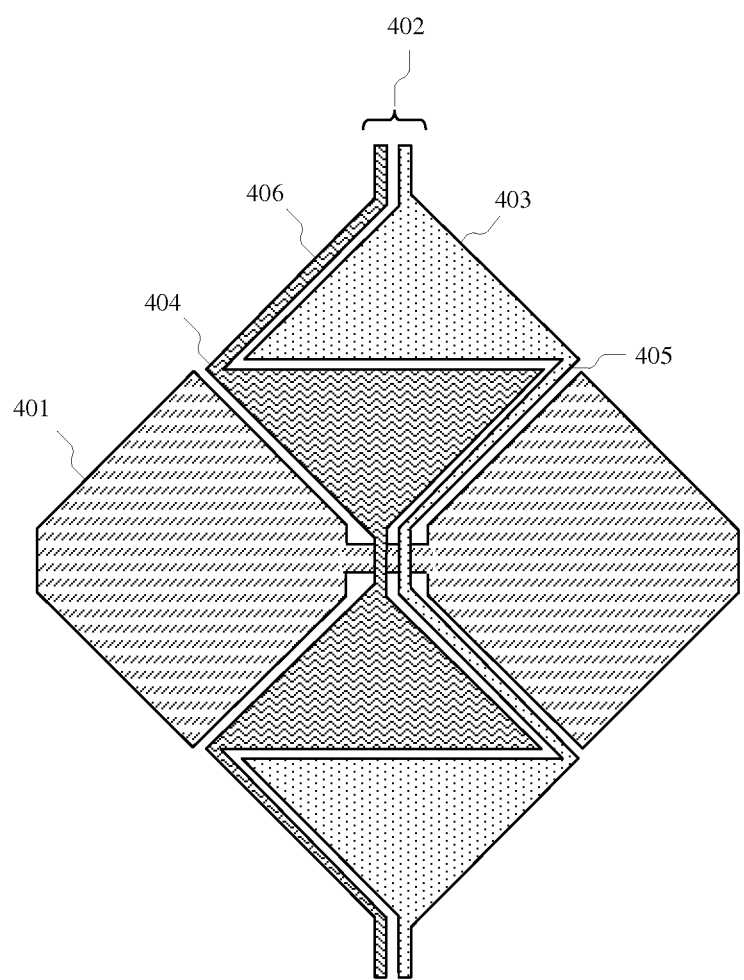
FIG. 14B shows the detail of exemplary electrodes patterned in accordance with a fifth embodiment of the invention

In accordance with a fifth embodiment of the invention, the most general embodiment of a second aspect of the invention, a mutual capacitance type touch panel device includes an electrode array comprising at least one each of a drive electrode, and a pair of matched sense electrodes. FIG. 14A shows an exemplary arrangement of the electrode array 400 with drive electrode 401 and sense electrode pair 402 which comprises a first dual-function electrode 403 and a second dual-function electrode 404. The first and second dual-function electrodes 403, 404 are arranged substantially symmetrically around each drive electrode such that the first (or second) dual-function electrode is adjacent to the drive electrode whilst the second (or first) dual-function electrode is separated from the drive electrode by the first (or second) dual-function electrode. As used herein, the term "symmetrical" refers to symmetry relative to at least one axis. The drive electrode 401 therefore forms a first mutual coupling capacitor (not shown in FIG. 14A) with the first dual-function electrode 403 and a second mutual coupling capacitor (not shown in FIG. 14A) with the second dual-function electrode 404. The first dual-function electrode 403 may be arranged to be adjacent to all even numbered drive electrodes 401 in the electrode array 400 and separated from all odd numbered drive electrodes 401. The second dual-function electrode 404 may be arranged to be adjacent to all odd numbered drive electrodes 401 in the electrode array 400 and separated from all even numbered drive electrodes 401. An example of said arrangement based on a conventional tessellating diamond pattern is shown in FIG. 14B.

The first and second dual-function electrodes 403, 404 may be arranged to act as either a sense electrode or a reference electrode depending on the location of the active drive electrode i.e. the drive electrode to which the voltage stimulus, $V_{DRV}$, is being applied. The dual-function electrode that is adjacent to the active drive electrode will be sensitive to the proximity of a touching object whilst the dual-function electrode that is separated from the active drive electrode will be substantially insensitive to the proximity of a touching object. Since the first and second dual-function electrodes 403, 404 are substantially symmetrically arranged around each drive electrode, the parasitic components of each dual-function electrode will therefore be identical i.e. $C_{OS}=C_{OR}$ and $C_{DS}=C_{DR}$. Accordingly, the dual-function electrode that is adjacent to the active drive electrode may be considered a sense electrode and used to detect the presence of a touching object and the dual-function electrode that is separated from the active drive electrode may be considered a reference electrode and used to measure the noise injected onto the sense electrode. In order to form a continuous electrode across the electrode array 400, the first dual-function electrodes 403 may contain narrow sections 405 (e.g., narrow relative to the dual function electrode) that pass between the second dual-function electrode 404 of the pair 402 and the drive electrode 401. Similarly, the second dual-function electrode 403 may contain narrow sections 406 (e.g., narrow relative to the dual function electrode) that pass between the first dual-function electrode 403 of the pair and the drive electrode 401. The width of the narrow sections 405, 406 and their separation from the drive electrode edge may be arranged such that all points on the sections are insensitive to the presence of a touching object (corresponding to Region A in FIG. 6). The presence of the narrow sections 405, 406 does not therefore adversely affect the operation of the touch panel.

Figure 15:
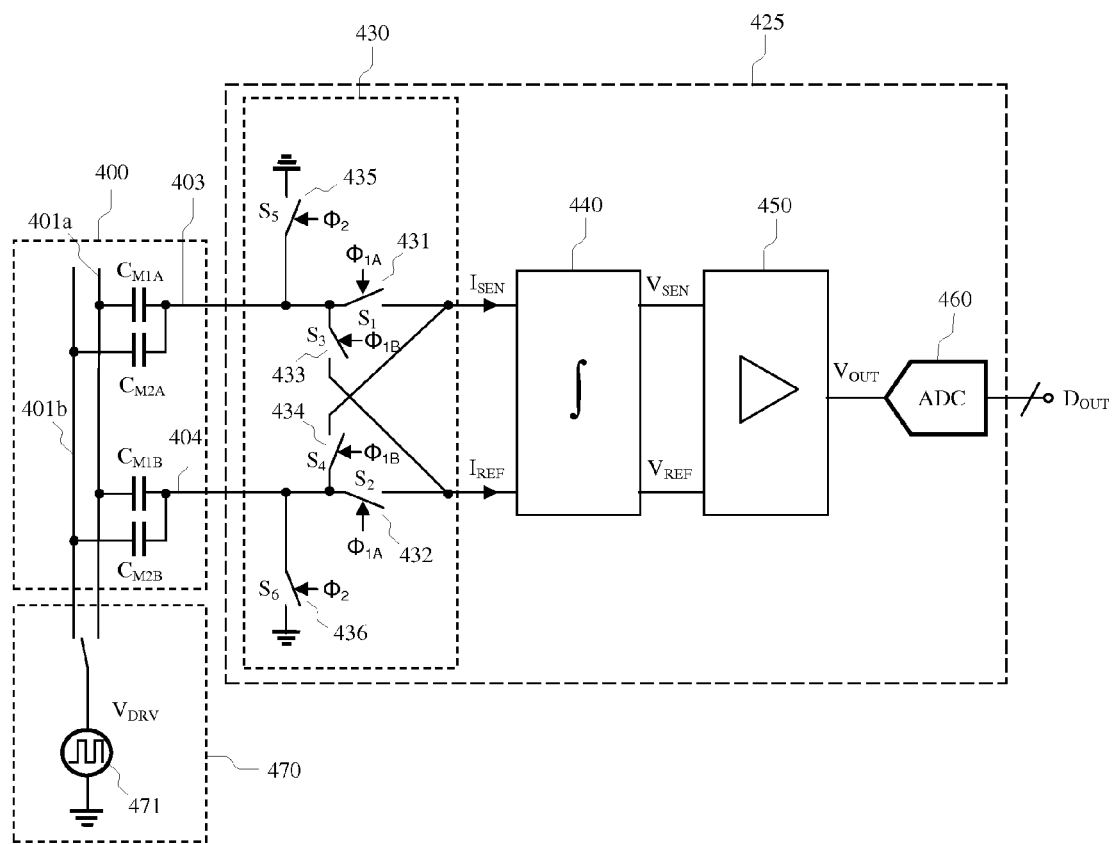
FIG. 15 shows an exemplary circuit in accordance with a fifth embodiment of the invention for measuring mutual capacitance
Figure 16:
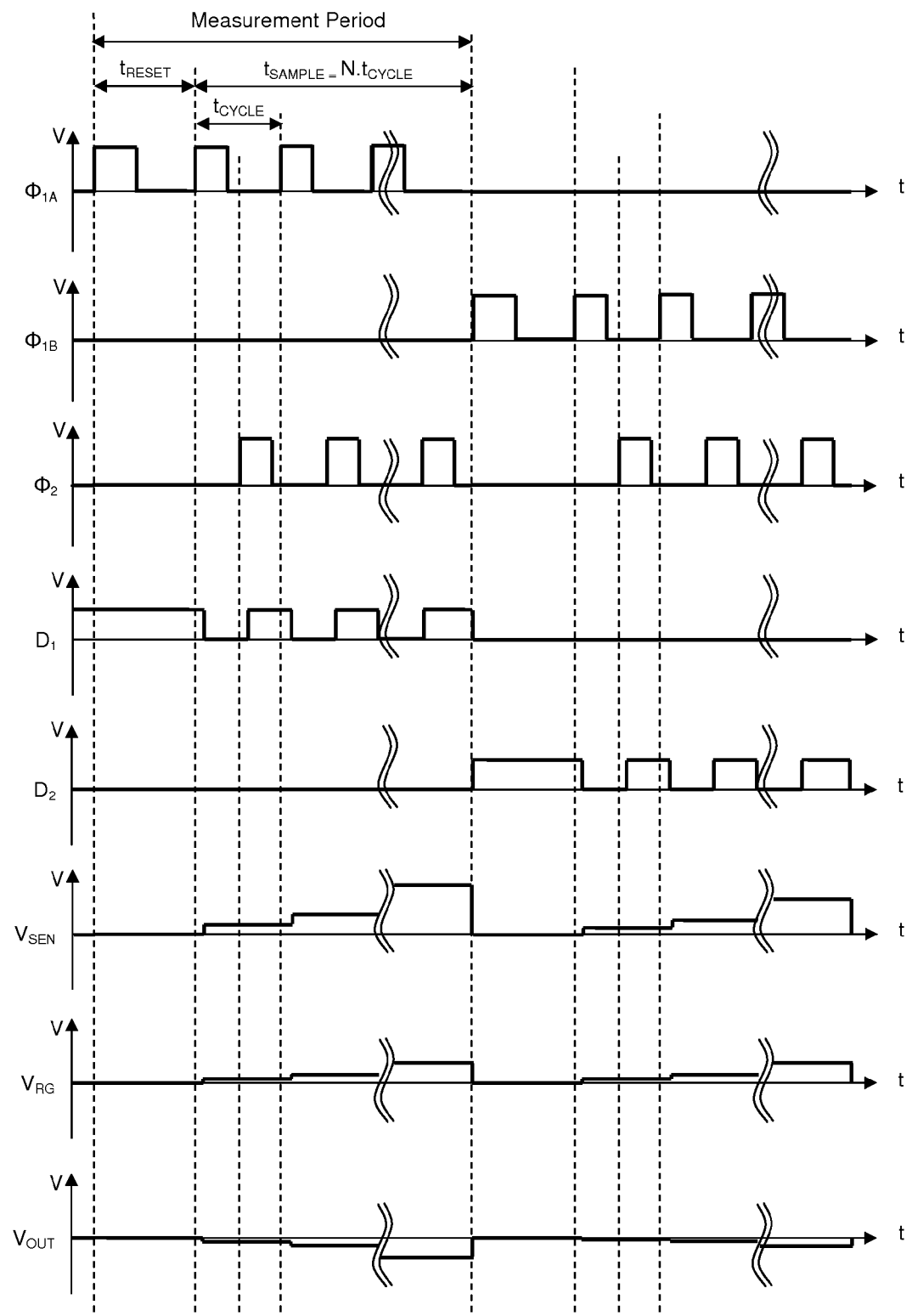
FIG. 16 shows a waveform timing diagram illustrating the operation of a fifth embodiment of the invention

A sensing circuit suitable for measuring the first and second mutual capacitances, $C_{M1}$, $C_{M2}$, and of calculating the difference between these measurements to produce a measurement of the proximity of a touching object with high SNR is shown in FIG. 15. The sensing circuit 425 may include a switching circuit 430, a differential integrator circuit 440, a differential amplifier circuit 450 and an analog-to-digital convertor 460. The differential integrator circuit 440, differential amplifier circuit 450 and analog-to-digital convertor circuit 460 may all be of a conventional design such as previously described. The switching circuit 430 may comprise first to sixth sampling switches (S1-S6) 431, 432, 433, 434, 435, 436. The first and second sampling switches may be controlled by a first switch control signal, $\phi_{1A}$, the third and fourth sampling switches by a second switch control signal, $\phi_{1B}$, and the fifth and sixth sampling switches by a third switch control signal, $\phi_2$. The first dual-function electrode 403 of the electrode array 400 is connected to the first, third and fifth switches 431, 433, 435 and the second dual-function electrode 404 is connected to the second, fourth and sixth switches 432, 434, 436. The operation of the sensing circuit 425 in conjunction with a drive circuit 470 is now described with reference to the waveform diagram of FIG. 16.

In a first measurement period, the first, second, fifth and sixth sampling switches 431, 432, 435, 436 of the switching circuit 130 are controlled with respect to a voltage stimulus, $V_{DRV}$, that is supplied to a first drive electrode 401a. The first dual-function electrode 403 is arranged to be adjacent to this first drive electrode 401a and the second dual-function electrode 404 to be separated from it. In a first reset stage of the first measurement period the differential integrator circuit 440 is reset and the first switch control signal, $\phi_{1A}$, is made active. The first and second dual-function electrodes 431, 432 are now driven to an initial voltage by the differential integrator circuit 440 via the first and second sampling switches 431, 432. A second sampling stage of the first measurement period is divided into a number of sampling cycles. At the start of each sampling cycle, the first switch control signal, $\phi_{1A}$, is activated causing the first and second sampling switches 431, 432 to close. The first dual-function electrode 403 is now connected to a first input terminal of the differential integrator 440 and the second dual-function electrode 404 to its second input terminal. The voltage generator unit 471 of the drive circuit 470 now changes the voltage of the drive signal applied to the first drive electrode 401a and this causes charge to be transferred to the input terminals of the differential integrator circuit 440 in proportion to the mutual coupling capacitors, $C_{M1A}$, $C_{M1B}$ of the electrode array 400. This transferred charge is integrated by the differential integrator 440 causing a change in the voltages, $V_{SEN}$, $V_{REF}$ seen at the output terminals of the differential integrator 440. The first switch control signal, $\phi_{1A}$, is then deactivated and the third switch control signal, $\phi_2$, is made active causing the fifth and sixth sampling switches 435, 436 to close and thereby set the voltage of the first and second dual-function electrodes 403, 404 to be equal to the ground potential. The voltage generator unit 471 of the drive circuit 470 returns the voltage of the drive signal applied to the first drive electrode to its initial value. Any charge transferred to the first and second dual-function transducers 403, 404 via the mutual coupling capacitors, $C_{M1}$, $C_{M2}$ as a result is discharged via the fifth and sixth sampling switches 435, 436.

This sampling cycle is then repeated N times during the sampling stage such that the total sampling time, $t_{SAMPLE} = N \cdot t_{CYCLE}$. At the end of the sampling period the analog-to-digital converter circuit 460 converts the differential amplifier output voltage, $V_{OUT}$, into a digital value, $D_{OUT}$.

In a proceeding second measurement period, the third, fourth, fifth and sixth sampling switches 433, 434, 435, 436 of the switching circuit 430 are controlled with respect to the voltage stimulus, $V_{DRV}$, that is now supplied to a second drive electrode 401b. Due to the substantially symmetrical arrangement of the sense electrode pair 402, the second dual-function electrode 404 is adjacent to this second drive electrode 401b and the first dual-function electrode 404 is separated from it. The reset and sampling stages of each sampling cycle proceed as described above except that it is the second switch control signal, $\phi_{1B}$, that is activated and deactivated to transfer charge to the differential integrator circuit 440. Accordingly, the first dual-function electrode 403 is connected to the second input terminal of the differential integrator circuit 440 and the second dual-function electrode 404 is connected to its first input terminal.

The sequence of operations of the first measurement period may be repeated for all odd numbered drive electrodes 401 in the electrode array 400 and the sequence of operations of the second measurement period may be repeated for all even numbered drive electrodes 401. In this way it is therefore possible to measure the mutual coupling capacitances associated with each intersection in the electrode array whilst simultaneously measuring the noise injected from the display device and the touching object. Thus, a high SNR measurement of the proximity of a touching object may be made. Further, since no dedicated reference electrode is required to be added to the electrode array, the spatial resolution of the touch panel device is increased compared to the prior art.

Figure 17A:
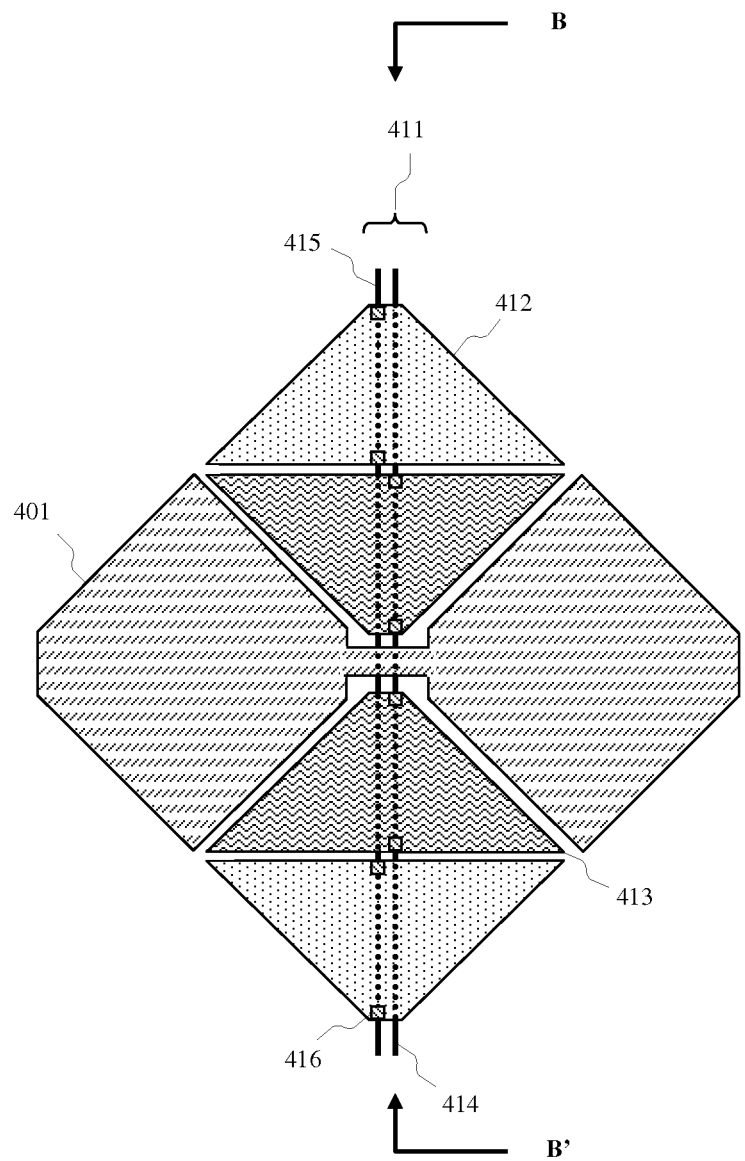
FIG. 17A shows the detail of exemplary electrodes patterned in accordance with a sixth embodiment of the invention
Figure 17B:
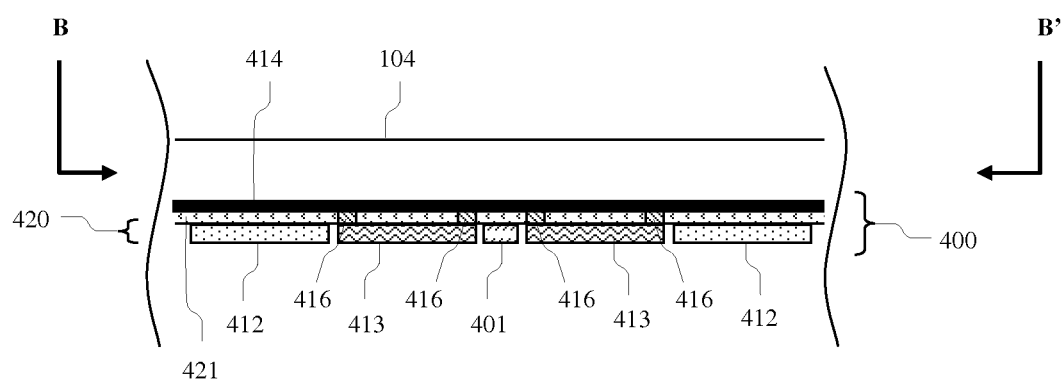
FIG. 17B shows the cross-section of an exemplary electrode array in accordance with a sixth embodiment of the invention

A disadvantage of the electrode arrangement described above is that the narrow sections may increase the total resistance of the first and second dual-function electrodes. In particular, if the electrodes are formed in a transparent material such as ITO the resistance of these narrow sections may be considerable and limit the frequency of signal that may be applied to the drive electrodes. The number of sampling cycles and hence the SNR of the touch panel SNR may be reduced. An electrode arrangement in accordance with a sixth embodiment of the invention is shown in FIG. 17A and FIG. 17B. As shown in FIG. 17A, the electrode array 400 includes a drive electrode 401 and sense electrode pair 411 which comprises a first dual-function electrode 412 and a second dual-function electrode 413. As described in the previous embodiment, the first and second dual-function electrodes 412, 413 are arranged substantially symmetrically around each drive electrode such that the first (or second) dual-function electrode is adjacent to the drive electrode whilst the second (or first) dual-function electrode is separated from the drive electrode by the first (or second) dual-function electrode. In order to reduce the total resistance of these electrodes two additional connecting wires are provided than run in the direction of the dual-function electrodes. A first connecting wire 414 is connected to the first dual-function electrode 412 and a second connecting wire 415 is connected to the second dual-function electrode 413. The cross-section shown in FIG. 17B illustrates how these connections may be made. The drive electrodes 401 and the first and second dual-function electrodes 412, 413 are formed in the same layer of transparent conductive material 420. The additional first and second connecting wires 414, 415 may be formed in a low resistance metallization layer, such as typically used in the manufacture of touch panels or liquid crystal displays. The sheet resistance of the metallization layer may be significantly smaller than the sheet resistance of the transparent conductive material used to form the electrodes. The connecting wires may additionally be narrow such that they have negligible impact on the transparency of the touch panel. Electrical isolation of the electrodes from the connecting wires is achieved by forming an electrically insulating layer 421 between the metallization layer and the layer of transparent conductive material 420. Contact holes 416 are formed in the electrically insulating layer 416 to connect the first and second connecting wires 414, 415 to the first and second dual-function electrodes as described above. The connecting wires therefore allow the total resistance of the dual-function electrodes to be reduced and the SNR of the touch panel maintained.

Figure 18:
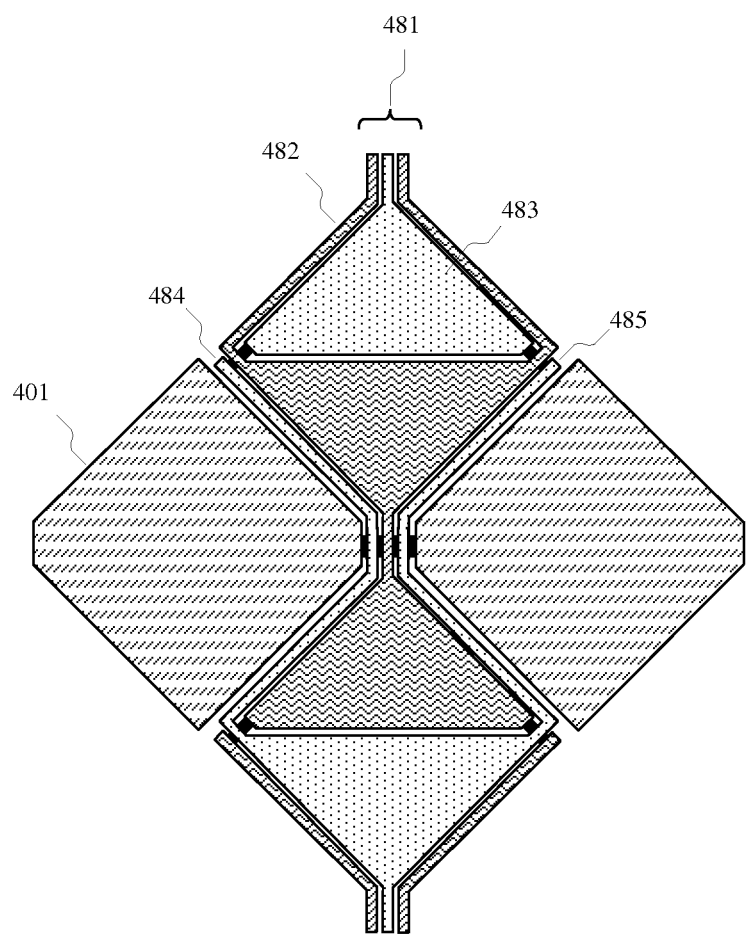
FIG. 18 shows the detail of exemplary electrodes patterned in accordance with a seventh embodiment of the invention

FIG. 18 shows an arrangement of a sense electrode pair 481 in accordance with a seventh embodiment of this invention. In this arrangement, the dual-function electrode separated from the active drive electrode acts as both a reference and guard electrode for the dual-function electrode adjacent to the drive electrode. For example, when a first dual-function electrode 482 is adjacent to the active drive electrode 401 the second dual-function electrode acts as both a reference and a guard electrode. The second dual-function electrode 483 has first and second narrow sections 484, 485 that may be arranged substantially symmetrically to pass between the sides of the first dual-function electrode 482 and the active drive electrode 401. The width of the first and second narrow sections 484, 485 and their separation from the drive electrode edge may be arranged such that all points on the sections are insensitive to the presence of a touching object (corresponding to Region A in FIG. 6). The narrow sections do not therefore adversely affect the operation of the touch panel and may act as a guard electrode.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The invention may find application in mid-size and large-size display and touch panel devices for industrial and consumer electronics. In particular, the invention may be used in products such as, but not limited to, Tablet PCs, Netbook PCs, Laptop PCs, mobile phones, personal digital assistants (PDAs), electronic books (eReaders), Satellite Navigation systems and the like.

The invention claimed is:

1. A mutual capacitance touch panel device, comprising: a substrate;
    an array of electrode elements formed on the substrate, each electrode element including a drive electrode, a sense electrode and a reference electrode, the reference electrode arranged between the drive electrode and the sense electrode;
    a first mutual coupling capacitance formed between the drive electrode and the reference electrode of each electrode element, wherein the drive electrode and reference electrode are configured such that the first mutual coupling capacitance is substantially insensitive to an object touching the surface of the touch panel;
    a second mutual coupling capacitance formed between the drive electrode and the sense electrode of each electrode element, wherein the drive electrode and sense electrode are configured such that the second mutual coupling capacitance varies with proximity of an object touching a surface of the touch panel; and
    a sensing circuit electrically coupled to the sense electrode, drive electrode and reference electrode of an electrode element, the sensing circuit configured to measure the first and second independent mutual coupling capacitances.

2. The device according to claim 1, wherein the sense electrodes and reference electrodes of the array of electrode elements are arranged in a first direction, and the drive electrodes of the array of electrode elements are arranged in a second direction, wherein the second direction is orthogonal to the first direction.

3. The device according to claim 2, wherein the sense electrodes and the reference electrodes of the array of electrode elements are extending in the first direction, and the drive electrodes of the array of electrode elements are extending in the second direction.

4. The device according to claim 1, wherein the reference electrode and the sense electrode of each electrode element are configured to generate substantially the same signals in response to electrical interference.

5. The device according to claim 1, further comprising a display device arranged relative to the touch panel device,
    wherein a first parasitic capacitance is formed between each sense electrode and the display device, and a second parasitic capacitance is formed between each reference electrode and the display device, and
    wherein an area of each sense electrode and an area of each reference electrode are substantially the same.

6. The device according to claim 1, further comprising:
    a display device arranged relative to the touch panel device,
    wherein a first parasitic capacitance is formed between each sense electrode and the display device, and a second parasitic capacitance is formed between each reference electrode and the display device, and
    wherein an area of the sense electrode of each electrode element is different from an area of the reference electrode of the respective electrode element; and
    a weighting circuit operatively coupled to each electrode element, the weighting circuit configured to scale signals received by the sense and reference electrodes to compensate for a difference between the first and second parasitic capacitances.

7. The device according to claim 1, wherein the reference electrode of each electrode element is patterned to surround the sense electrode of the respective electrode element and to occupy an area between the surrounded sense electrode and an adjacent drive electrode of the respective electrode element.

8. The device according to claim 1, wherein the drive electrodes of the array of electrode elements are patterned into a series of connected diamonds.

9. The device according to claim 1, wherein the drive, sense and reference electrodes of the array of electrode elements are patterned as at least one of rectangular rows and columns or tessellating shapes.

10. The device according to claim 1, wherein the reference electrode of each electrode element is separated into a first reference electrode section and a second reference electrode section, the first reference electrode section arranged between the drive electrode and the sense electrode of the respective electrode element, and the second reference electrode section arranged within the sense electrode of the respective electrode element.

11. The device according to claim 10, wherein a width of the first reference electrode section and a separation distance between the first reference electrode section and an edge of the drive electrode of each electrode element is configured such that all points on the first reference electrode section are substantially insensitive to an object touching the surface of the touch panel.

12. The device according to claim 10, wherein a width of the second reference electrode section and a separation distance between the second reference electrode section and an edge of the drive electrode of each electrode element is configured such that all points on the second reference electrode section are substantially insensitive to an object touching the surface of the touch panel.

13. The device according to claim 10, wherein a width of the sense electrode and a separation distance between the sense electrode and an edge of the drive electrode of each electrode element is configured such that all points on the sense electrode are sensitive to an object touching the surface of the touch panel.

14. The device according to claim 1, wherein an area of the reference electrode and an area of the sense electrode of each electrode element are selected such that a parasitic capacitance of the reference electrode is substantially equal to a parasitic capacitance of the sense electrode.

15. The device according to claim 1, wherein the sensing circuit is configured to sample the first and second mutual coupling capacitances twice per sampling period.

16. The device according to claim 1, wherein the sense electrode and the reference electrode of each electrode element are arranged such that a baseline value of the mutual capacitance between the drive electrode and sense electrode is substantially equal to the mutual capacitance between the drive electrode and the reference electrode of the respective electrode element.

17. The device according to claim 1, further comprising a host device coupled to the touch panel device.

18. A method for creating a mutual capacitance touch panel device, comprising:

forming an array of electrode elements on a substrate, each electrode element including a drive electrode, a sense electrode and a reference electrode, the reference electrode arranged between the drive electrode and the sense electrode, wherein each electrode element is arranged such that a first mutual coupling capacitance formed between the drive electrode and the reference electrode of the respective electrode element is substantially insensitive to an object touching the surface of the touch panel and a second mutual coupling capacitance formed between the drive electrode and the sense electrode of the respective electrode element varies with proximity of an object touching a surface of the touch panel; and electrically coupling the sense electrode, drive electrode and reference electrode of an electrode element to a sensing circuit, the sensing circuit configured to measure the first and second independent mutual coupling capacitances.

19. The method according to claim 18, wherein forming the array of electrode elements includes arranging the sense electrodes and reference electrodes of the array of electrode elements in a first direction, and arranging the drive electrodes of the array of electrode elements in a second direction, wherein the second direction is orthogonal to the first direction.

* * * * *